US012763429B2

(12) United States Patent
Roudebush et al.

(10) Patent No.: US 12,763,429 B2
(45) Date of Patent: *Oct. 13, 2026

(54) BATTERY CELL INCLUDING AN INORGANIC, MELT-INFILTRATED, SOLID-STATE ELECTROLYTE

(71) Applicant: Sila Nanotechnologies, Inc., Alameda, CA (US)

(72) Inventors: John Roudebush, San Francisco, CA (US); Naoki Nitta, Alameda, CA (US); Yulia Trenikhina, Alameda, CA (US); Gleb Nikolayevich Yushin, Atlanta, GA (US)

(73) Assignee: Sila Nanotechnologies, Inc., Alameda, CA (US)

( * ) Notice: Subject to any disclaimer, the term of this patent is extended or adjusted under 35 U.S.C. 154(b) by 497 days.

This patent is subject to a terminal disclaimer.

(21) Appl. No.: 18/349,804

(22) Filed: Jul. 10, 2023

(65) Prior Publication Data

US 2024/0339726 A1 Oct. 10, 2024

Related U.S. Application Data

(63) Continuation of application No. 18/062,373, filed on Dec. 6, 2022.

(60) Provisional application No. 63/264,996, filed on Dec. 6, 2021.

(51) Int. Cl.

| | |
|---|---|
| ***H01M 50/44*** | (2021.01) |
| ***H01M 4/02*** | (2006.01) |
| ***H01M 4/525*** | (2010.01) |
| ***H01M 10/0525*** | (2010.01) |
| ***H01M 10/0562*** | (2010.01) |
| ***H01M 50/491*** | (2021.01) |

(52) U.S. Cl.

CPC ........... *H01M 50/44* (2021.01); *H01M 4/525* (2013.01); *H01M 10/0525* (2013.01); *H01M 10/0562* (2013.01); *H01M 50/491* (2021.01); *H01M 2004/028* (2013.01); *H01M 2300/008* (2013.01)

(58) Field of Classification Search

None

See application file for complete search history.

(56) References Cited

U.S. PATENT DOCUMENTS

| | | | | |
|---|---|---|---|---|
| 11,502,332 | B2 * | 11/2022 | Yushin | H01M 4/622 |
| 11,837,697 | B2 | 12/2023 | Yushin et al. | |
| 12,431,529 | B2 * | 9/2025 | Wensley | H01M 50/454 |
| 2009/0214956 | A1 | 8/2009 | Prieto et al. | |
| 2019/0198837 | A1 * | 6/2019 | Yushin | H01M 50/44 |
| 2020/0223704 | A1 | 7/2020 | Neale et al. | |
| 2020/0266442 | A1 | 8/2020 | Badding et al. | |
| 2020/0343580 | A1 * | 10/2020 | Yushin | H01M 10/0565 |
| 2020/0358086 | A1 | 11/2020 | Hu et al. | |
| 2020/0403267 | A1 | 12/2020 | Li et al. | |
| 2021/0344080 | A1 * | 11/2021 | Zhang | H01M 50/434 |
| 2023/0063684 | A1 | 3/2023 | Li et al. | |
| 2023/0088113 | A1 * | 3/2023 | Yushin | H01M 4/625 429/323 |
| 2023/0129659 | A1 * | 4/2023 | Abe | H01M 4/505 252/182.1 |
| 2023/0178797 | A1 * | 6/2023 | Roudebush | H01M 4/525 429/319 |
| 2023/0335793 | A1 * | 10/2023 | Lv | C08F 2/06 |
| 2025/0273815 | A1 * | 8/2025 | Ji | H01M 10/056 |
| 2025/0316848 | A1 * | 10/2025 | Jo | H01M 50/446 |

* cited by examiner

*Primary Examiner* — Kevin M Bernatz

(74) *Attorney, Agent, or Firm* — MUNCY, GEISSLER, OLDS & LOWE, P.C.; Daniel Podhajny

(57) ABSTRACT

A solid-state Li-ion battery cell includes an anode, a cathode, and a solid electrolyte interposed between the anode and the cathode. The anode includes anode active material and the cathode includes cathode active material. The solid electrolyte includes a melt-infiltration solid electrolyte composition infiltrated in at least a portion of the anode and at least a portion of the cathode. The melt-infiltration solid electrolyte composition includes a lithium halide compound selected from: $Li_{1+x}Mg_xAl_{1-x}Cl_4$, $Li_2MgCl_4$, LiCl, and $LiAlCl_4$. The solid electrolyte is characterized by a melting temperature of approximately 200° C. or less (e.g., in some designs, approximately 150° C. to approximately 156° C.).

20 Claims, 11 Drawing Sheets
(2 of 11 Drawing Sheet(s) Filed in Color)

BATTERY CELL INCLUDING AN INORGANIC, MELT-INFILTRATED, SOLID-STATE ELECTROLYTE

CROSS-REFERENCE TO RELATED APPLICATIONS

The present application for Patent is a Continuation of U.S. Non-Provisional application Ser. No. 18/062,373, entitled "BATTERY CELL INCLUDING AN INORGANIC, MELT-INFILTRATED, SOLID-STATE ELECTROLYTE," filed Dec. 6, 2022, which in turn claims the benefit of U.S. Provisional Application No. 63/264,996, entitled "BATTERY CELL INCLUDING AN INORGANIC, MELT-INFILTRATED, SOLID-STATE ELECTROLYTE," filed Dec. 6, 2021, each of which is assigned to the assignee hereof, and expressly incorporated herein by reference in its entirety.

GOVERNMENT LICENSE RIGHTS

This invention was made with government support under contract number DE-AR0001054 awarded by the Advanced Research Projects Agency-Energy (ARPA-E) within the United States Department of Energy (DOE). The government has certain rights in the invention.

BACKGROUND

Field

Aspects of the present disclosure relates generally to energy storage devices, and more particularly to metal and metal-ion battery technology and the like.

BACKGROUND

Owing in part to their relatively high energy densities, relatively high specific energy, light weight, and potential for long lifetimes, advanced rechargeable metal batteries, and rechargeable metal and metal-ion batteries, such as lithium metal (Li) and lithium-ion (Li-ion) batteries, are desirable for a wide range of consumer electronics, electric vehicle, grid storage and other important applications. Similarly, primary (largely not rechargeable) metal and metal-ion batteries, such as primary Li batteries, are desired for a range of applications, where high energy density and/or high specific energy of batteries is needed, even if the batteries may be disposed of after a single use.

However, despite the increasing commercial prevalence of Li-ion batteries and some of the Li primary batteries, further development of these and other metal-ion and metal batteries is needed, particularly for potential applications in low- or zero-emission, hybrid-electrical or fully-electrical vehicles, consumer electronics, energy-efficient cargo ships and locomotives, aerospace applications, and power grids.

One desired feature of metal and metal-ion batteries for some applications is enhanced safety. It is desirable that batteries do not induce fire, even under extreme cases such as a nail penetration test or during overheating. Solid electrolytes may, in principle, provide such enhanced safety. Unfortunately, the practical applications of solid-state batteries with solid electrolytes are often limited by lower energy density, lower power density (particularly at low temperatures), and higher costs.

Another desired feature of metal and metal-ion batteries is enhanced energy density. Furthermore, it is typically desirable for higher energy density to not lead to a substantial reduction in cycle stability of the cell or a reduction in rate performance, which is very challenging to achieve.

Accordingly, there remains a need for improved metal and metal-ion batteries, components, and other related materials and manufacturing processes.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a solid-state Li-ion battery cell includes an anode comprising anode active material; a cathode comprising cathode active material; and a solid electrolyte interposed between the anode and the cathode, the solid electrolyte comprising a melt-infiltration solid electrolyte composition infiltrated in at least a portion of the anode and at least a portion of the cathode; wherein the melt-infiltration solid electrolyte composition comprises a lithium halide compound selected from: $Li_{1+x}Mg_xAl_{1-x}Cl_4$, $Li_2MgCl_4$, LiCl, and $LiAlCl_4$, the x ranging between 0.00 and 1.00; and wherein the solid electrolyte is characterized by a melting temperature of approximately 200° C. or less.

In an aspect, a method of making a solid-state Li-ion battery cell, comprising the steps of: (A1) providing a solid electrolyte composition comprising a lithium halide compound selected from: $Li_{1+x}Mg_xAl_{1-x}Cl_4$, $Li_2MgCl_4$, LiCl, and $LiAlCl_4$, the x ranging between 0.00 and 1.00; (A2) providing battery cell components including an anode comprising anode active material and a cathode comprising cathode active material; (A3) assembling the battery cell components and the solid electrolyte composition to form a battery cell assembly, the solid electrolyte composition being interposed between the anode and the cathode in the battery cell assembly; (A4) applying melt-infiltration treatment of the battery cell assembly comprising melting the solid electrolyte composition at a melt-treatment temperature such that a molten solid electrolyte composition infiltrates into at least a portion of the anode and at least a portion of the cathode; and (A5) cooling the battery cell assembly to form the solid-state Li-ion battery cell comprising a solid electrolyte comprising a melt-infiltration solid electrolyte composition that is formed from the molten solid electrolyte composition and is infiltrated in at least the portion of the anode and at least the portion of the cathode; wherein the solid electrolyte is characterized by a melting temperature of approximately 200° C. or less.

In an aspect, a method of making an electrode for a solid-state Li-ion battery cell, comprising the steps of: (B1) providing an electrode coating comprising electrode active material; (B2) providing a solid electrolyte composition comprising a lithium halide compound selected from: $Li_{1+x}Mg_xAl_{1-x}Cl_4$, $Li_2MgCl_4$, LiCl, and $LiAlCl_4$, the x ranging between 0.00 and 1.00; (B3) contacting the solid electrolyte composition to the electrode coating; (B4) applying melt-infiltration treatment of the solid electrolyte composition and the electrode coating comprising melting the solid electrolyte composition at a melt-treatment temperature such that a molten solid electrolyte composition infiltrates into at least a portion of the electrode coating; and (B5) cooling the infiltrated molten solid electrolyte composition and the electrode coating to form the electrode comprising a solid electrolyte comprising a melt-infiltration solid electrolyte composition that is formed from the molten solid electrolyte composition and is infiltrated in at least the portion of the electrode; wherein the solid electrolyte is characterized by a melting temperature of approximately 200° C. or less.

In one aspect, a solid-state Li-ion battery (SSLB) cell includes: an anode including anode active material; a cathode including cathode active material; and a solid electrolyte interposed between the anode and the cathode, including a melt-infiltration solid electrolyte composition infiltrated in at least a portion of the anode and/or at least a portion of the cathode. In some designs, the melt-infiltration solid electrolyte composition includes a lithium halide compound selected from: $Li_{1+x}Mg_xAl_{1-x}Cl_4$, $Li_2MgCl_4$, LiCl, LiF, $MgCl_2$, $ZrCl_4$, $YbCl_3$, $YCl_3$, $NbCl_5$, $Li_2ZrCl_6$, $Li_3YbCl_6$, $Li_3YCl_6$, and $LiAlCl_4$ or their mixtures and solid solutions. In some designs, the solid electrolyte is characterized by a melting temperature of approximately 200° C. or less: for example, the $LiAlCl_4$ solid electrolyte was observed to have a melting temperature of around 150° C., the LMAC 0.05 solid electrolyte was observed to have a melting temperature of around 156° C., and the LMAC 0.33 solid electrolyte was observed to have melting temperature of around 156° C.

In some aspects, the lithium halide compound of the SSLB cell is $Li_{1+x}Mg_xAl^{1-x}Cl_4$ and the x in $Li_{1+x}Mg_xAl_{1-x}Cl_4$ is approximately 0.33.

In some aspects, the SSLB cell additionally includes a separator interposed between the anode and the cathode. In some designs, the melt-infiltration solid electrolyte composition is infiltrated in at least a portion of the separator.

In another aspect, a method of making a solid-state Li-ion (SSLB) cell includes steps (A1), (A2), (A3), (A4), and (A5). (A1) includes providing a solid electrolyte composition comprising a lithium halide compound selected from: $Li_{1+x}Mg_xAl_{1-x}Cl_4$, $Li_2MgCl_4$, LiCl, LiF, $MgCl_2$, $ZrCl_4$, $YbCl_3$, $YCl_3$, $NbCl_5$, $Li_2ZrCl_6$, $Li_3YbCl_6$, $Li_3YCl_6$, and $LiAlCl_4$ or their mixtures and solid solutions. (A2) includes providing battery cell components including an anode comprising anode active material and a cathode comprising cathode active material (and, in some designs, a porous separator or a separator layer deposited on the surface of at least one of the anode and/or the cathode or both). (A3) includes assembling the battery cell components and the solid electrolyte composition to form a battery cell assembly. (A4) includes conducting melt-infiltration treatment of the battery cell assembly including melting the solid electrolyte composition at a melt-treatment temperature such that the molten solid electrolyte composition infiltrates into at least a portion of the anode or at least a portion of the cathode or both. In some designs, the melting point of the solid electrolyte composition and/or the melt-treatment temperature is approximately 160-200° C. or less. (A5) includes cooling the battery cell assembly to form the battery cell including a solid electrolyte comprising the melt-infiltration solid electrolyte composition infiltrated in at least a portion of the anode or at least a portion of the cathode or both.

In some aspects of the method of making a SSLB cell, the battery cell components additionally include a separator; the battery cell assembly additionally includes the separator interposed between the anode and the cathode in the battery cell assembly; (A4) additionally includes the molten solid electrolyte composition infiltrating into at least a portion of the separator; and the melt-infiltration solid electrolyte composition is infiltrated in at least a portion of the separator in the battery cell upon the (A5) cooling of the battery cell assembly.

In yet another aspect, a method of making an anode for a solid-state Li-ion battery (SSLB) cell includes steps (B1), (B2), (B3), (B4), and (B5), (B1) includes providing an anode coating including anode active material. (B2) includes providing a solid electrolyte composition including a lithium halide compound selected from: $Li_{1+x}Mg_xAl_{1-x}Cl_4$, $Li_2MgCl_4$, LiCl, LiF, $MgCl_2$, $ZrCl_4$, $YbCl_3$, $YCl_3$, $NbCl_5$, $Li_2ZrCl_6$, $Li_3YbCl_6$, $Li_3YCl_6$, and $LiAlCl_4$ or their mixtures and solid solutions. (B3) includes contacting the solid electrolyte composition to the anode coating. (B4) includes conducting melt-infiltration treatment of the solid electrolyte composition and the anode coating including melting the solid electrolyte composition at a melt-treatment temperature such that the molten solid electrolyte composition infiltrates into at least a portion of the anode coating. In some designs, the melting point of the solid electrolyte composition and/or the melt-treatment temperature is approximately 160-200° C. or less. (B5) includes cooling the infiltrated molten second solid electrolyte composition and the anode coating to form the anode including a solid electrolyte including the melt-infiltration solid electrolyte composition infiltrated in at least a portion of the anode. In some designs, a concentration of In and/or Br in the solid electrolyte composition is 1 wt. % or less. In some designs, a concentration of In and/or Br in the solid electrolyte composition is 0.1 wt. % or less. In some designs, the anode active material is selected from: lithium iron phosphate, lithium nickel cobalt aluminum oxide, and lithium titanate.

In yet another aspect, a method of making a cathode for a solid-state Li-ion battery (SSLB) cell includes steps (C1), (C2), (C3), (C4), and (C5), (C1) includes providing a cathode coating including cathode active material. (C2) includes providing a solid electrolyte composition including a lithium halide compound selected from: $Li_{1+x}Mg_xAl_{1-x}Cl_4$, $Li_2MgCl_4$, LiCl, LiF, $MgCl_2$, $ZrCl_4$, $YbCl_3$, $YCl_3$, $NbCl_5$, $Li_2ZrCl_6$, $Li_3YbCl_6$, $Li_3YCl_6$, and $LiAlCl_4$ or their mixtures and solid solutions. (C3) includes contacting the solid electrolyte composition to the cathode coating. (C4) includes conducting melt-infiltration treatment of the solid electrolyte composition and the cathode coating at a melt-treatment temperature such that the molten solid electrolyte composition infiltrates into at least a portion of the cathode coating. In some designs, the melting point of the solid electrolyte composition and/or the melt-treatment temperature is approximately 160-200° C. or less. (C5) includes cooling the infiltrated molten solid electrolyte composition and the cathode coating to form the cathode including a solid electrolyte including the melt-infiltration solid electrolyte composition infiltrated in at least a portion of the cathode. In some designs, the lithium halide compound is $Li_{1+x}Mg_xAl_{1-x}Cl_4$ and the x in $Li_{1+x}Mg_xAl_{1-x}Cl_4$ ranges between 0.0 and 0.33.

In some designs, the cathode active material is selected from: lithium iron phosphate, lithium manganese iron phosphate, lithium nickel manganese cobalt oxide, lithium nickel manganese oxide, lithium nickel oxide (including a doped one), lithium manganese oxide, lithium nickel cobalt aluminum oxide, and lithium nickel cobalt manganese aluminum oxide.

In some designs, a solid-state Na-ion battery (SSNB) cell is designed and produced by a similar method, except that Li is substituted by Na in the electrolyte and electrode compositions. In some designs, other Na-ion cathodes (e.g., Prussian White analogs) are utilized in the SSNB construction.

Other objects and advantages associated with the aspects disclosed herein will be apparent to those skilled in the art based on the accompanying drawings and detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

DETAILED DESCRIPTION

Figure 1:
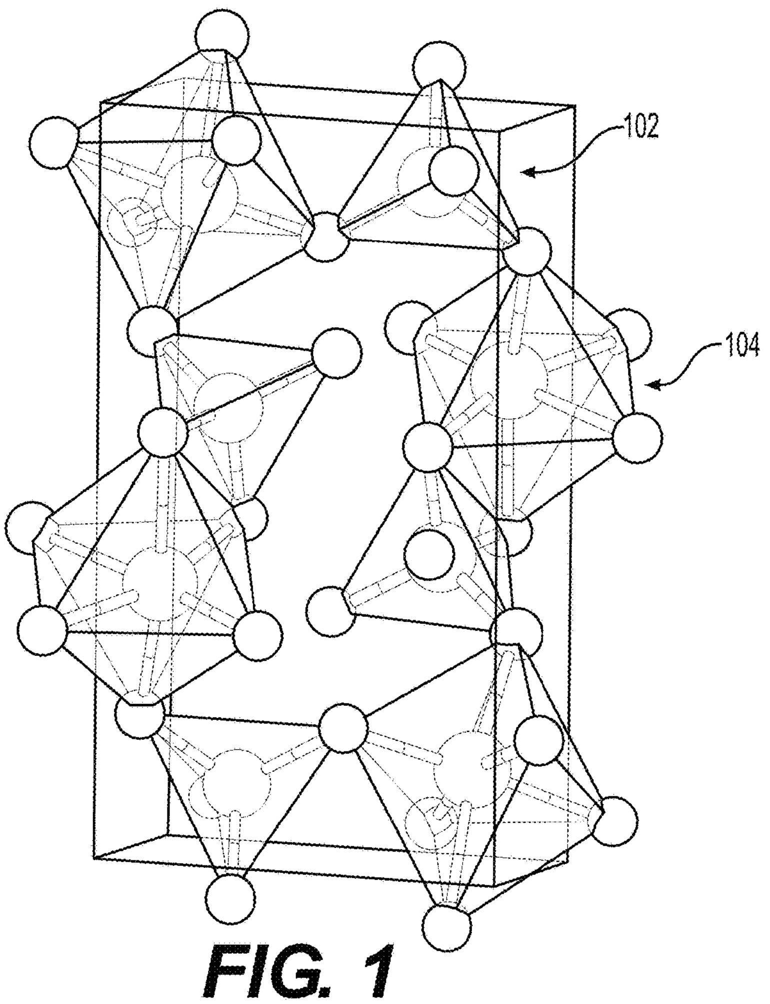
FIG. 1 is a lattice structure diagram of $LiAlCl_4$ (LAC). $LiCl_6$ octahedra (104) and $AlCl_4$ tetrahedra (102) are shown.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

While the description below may describe certain examples in the context of rechargeable (often called "secondary") Li and Li-ion batteries (for brevity and convenience, and because of the current popularity of Li technology), it will be appreciated that various aspects may be applicable to other rechargeable as well as co-called "primary" (non-rechargeable) batteries, such as secondary and primary metal and metal-ion batteries (such as Na and Na-ion, Mg and Mg-ion, Al and Al-ion, K and K-ion, Cs and Cs-ion, Ca and Ca-ion, Zn and Zn-ion and others).

While the description below may describe certain examples of the solid electrolytes in the context of cation-based (such as metal-ion, including Li-ion cation-based) electrolytes where cations (such as $Li^+$ cations and others) contribute to the vast majority (e.g., up to about 90-100%) of the total electrolyte ionic conductivity, it will be appreciated that various aspects may be applicable to solid electrolytes that either primarily (e.g., by about 90-100%) rely on anion conduction (such as $F^-$ or $Cl^-$ or $OH^-$ or other anion conduction) or exhibit mixed cationic and anionic conductivities, where each type of ions contribute to more than about 10% and less than about 90% of the total ionic conductivity.

While the description below may describe certain examples in the context of single phase (including a solid solution) electrolyte compositions, it will be appreciated that various aspects may be applicable to composition comprising two or three or even four distinct phases. Each phase may exhibit a different melting point, mechanical properties, microstructure, density, chemical composition and/or ionic conductivity.

While the description below may describe certain examples in the context of one type or composition of the electrolyte in cells, it will be appreciated that various aspects may be applicable to cells comprising two or three or more electrolyte compositions. Each electrolyte composition may exhibit a different melting point, mechanical properties, microstructure, density, chemical composition and/or ionic conductivity. In some designs, an anode may comprise a different electrolyte composition or different electrolyte mixture than a cathode or a separator membrane layer. Similarly, in some designs, a cathode may comprise a different electrolyte composition or different electrolyte mixture than an anode or a separator membrane layer.

While the description below may describe certain examples of cathode or anode materials in the context of certain types of intercalation-type electrode chemistries, it will be appreciated that various aspects may be applicable to various other types of intercalation-type cathode or anode chemistries as well as various types of conversion-type electrode chemistries.

Specifically, examples of suitable intercalation-type cathodes (including high voltage cathodes) in the context of Li or Li-ion chemistries include but are not limited to: lithium nickel cobalt aluminum oxides (NCA), lithium nickel cobalt manganese aluminum oxides (NCMA), lithium nickel oxides (LNO), lithium manganese oxides (LMO), lithium nickel manganese cobalt oxides (NCM), lithium cobalt oxide (LCO), lithium cobalt aluminum oxides (LCAO), lithium iron phosphate (LFP), lithium cobalt phosphate (LCP), lithium manganese phosphate (LMP), lithium manganese iron phosphate (LMFP), lithium vanadyl phosphate (LVOP), lithium nickel phosphate ($LiNiPO_4$), lithium vanadium fluoro phosphate (LiVFPO4), lithium iron fluoro sulfate ($LiFeSO_4F$), various Li excess materials (e.g., lithium excess (rocksalt) transition metal oxides and oxy-fluorides such as $Li_{1.211}Mo_{0.467}Cr_{0.3}O_2$. $Li_{1.3}Mn_{0.4}Nb_{0.3}O_2$, $Li_{1.2}Mn_{0.4}Ti_{0.4}O_2$, $Li_{1.2}Ni_{0.333}Ti_{0.333}Mo_{0.133}O_2$ and many others), various high capacity Li-ion based materials with partial substitution of oxygen for fluorine or iodine (e.g., rocksalt $Li_2Mn_{2/3}Nb_{1/3}O_2F$, $Li_2Mn_{1/2}Ti_{1/2}O_2F$, $Li_{1.5}Na_{0.5}MnO_{2.85}I_{0.12}$, among others) and many other types of Li-comprising disordered, layered, tavorite, olivine, or spinel type active materials or their mixtures comprising at least oxygen or fluorine or sulfur and at least one transition metal and other lithium transition metal (TM) oxides or phosphates or sulfates (or mixed) cathode or anode materials that rely on the intercalation of lithium (Li) and changes in the TM oxidation state (including, but not limited to those that may be doped or heavily doped; including, but not limited to those that have gradient in composition or core-shell morphology; including, but not limited to those that may be partially fluorinated or comprise some meaningful fraction of fluorine (e.g., about 0.001-10 at. %) in their composition, etc.). It will also be appreciated that various aspects may be applicable to high-voltage lithium transition metal oxide (or phosphate or sulfate or mixed or other) cathodes where TMs and oxygen (O) are covalently bonded and both TM and O take part in electrochemical reduction-oxidation (redox) reactions during charge and discharge (including, but not limited to, those oxides or phosphate or sulfate or mixed cathodes that may comprise at least about 0.25 at. % of Mn, Fe, Ni, Co, Nb, Mg, Cr, Mo, Zr, W, Ta, Ti, Hf, Y, La, Sb, V, Sn, Si, or Ge).

While the description below may also describe certain examples of the cathode or anode material formulations (for use in combination with melt-infiltrated and other suitable solid electrolytes) in a Li-free state, it will be appreciated that various aspects may be applicable to various Li-containing electrodes (e.g., in either partially or fully discharged or partially or fully charged state). In some designs, it may be advantageous for the (full) cells to be filled with a solid electrolyte in a fully discharged state. In some designs, various material properties (e.g., at particle level, at inter-particle level, at electrode level, etc.) may change based on whether active material particle(s) are in a Li-free state, a partially lithiated state, or a fully lithiated state. Such Li-dependent material properties may include particle pore volume, electrode pore volume, and so on. Below, unless stated or implied otherwise, reference to such Li-dependent material properties (e.g., at particle level, at inter-particle level, at electrode level, etc.) may be assumed to be provided as if the active material particles are in the Li-free state.

While the description below may describe certain cathode examples (for use in combination with melt-infiltrated and other suitable solid electrolytes) in the context of layered intercalation cathodes, it will be appreciated that various aspects may be applicable for conversion-type or mixed conversion-intercalation type cathode chemistry, such as sulfur and $Li_2S$, selenium and $Li_2Se$, metal fluorides of "pure" fluoride-based chemistry of active conversion-type cathode materials (e.g., LiF and Cu, LiF and Fe, LiF and Fe—Cu, $FeF_3$, $CuF_2$, $NiF_2$, $MnF_3$, $BiF_3$, $BiF_5$, Cu—Fe—F (note that "A-B-C- . . . " refers to the general composition comprising A, B, C, etc. without specifying the relative content of the A, B, C and possibly other elements). Cu—Fe—Mn—F, Cu—Fe—Ni—F, Fe—Ni—F and many other "pure" metal fluoride-based chemistries based on one, two, three or more metals), as well as cathodes comprising metal oxyfluorides/oxy-fluorides (e.g., Cu—O—F, Fe—O—F, Fe—Cu—O—F, Bi—O—F, Bi—Fe—O—F, Bi—Fe—Cu—F, Fe—Al—O—F, Cu—Al—O—F, Fe—Ni—O—F, Cu—Ni—O—F, Fe—Cu—Al—O—F, Fe—Ni—Al—O—F, Fe—Ni—La—O—F, Fe—La—O—F, Cu—La—O—F, Fe—Cu—La—O—F, Cu—Li—O—F, Fe—Li—O—F, Fe—Cu—Li—O—F, Fe—Cu—La—Li—O—F, Fe—Cu—Al—Li—O—F, Fe—Cu—Mn—Li—O—F, Fe—Cu—Ni—Li—O—F, and other compositions comprising various metal cations and mixed F and O anions), metal chloro-fluorides (e.g., Cu—Cl—F, Fe—Cl—F, Fe—Cu—Cl—F, Fe—Cu—Ni—Cl—F, Fe—Cu—Al—Cl—F, Cu—Li—Cl—F, Fe—Li—Cl—F, Fe—Cu—Li—Cl—F, Fe—Cu—Mn—Li—Cl—F, Fe—Cu—Ni—Li—Cl—F, and various other compositions comprising mixed F and Cl anions), metal bromo-fluorides (various compositions comprising metal(s) and mixed F and Br anions), metal hydro-fluorides (various compositions comprising metal(s) and hydrogen cations and F anions), metal hydroxy-fluorides (various compositions comprising metal(s) and hydrogen cations and mixed F and O anions), metal oxy-chloro-fluorides (various compositions comprising mixed F, Cl and O anions), metal oxy-bromo-fluorides (various compositions comprising mixed F. Br and O anions), metal sulfo-fluorides (various compositions comprising mixed F and S anions), metal sulfo-oxy-fluorides (various compositions comprising mixed F. O and S anions), their various mixtures, alloys and other combinations and other mixed anions' comprising conversion-type cathode compositions (including those that may comprise Li, H, none-Li alkali metals, alkali earth metals, yttrium, lanthanum, lanthanoid metals and transition metals as well F, Cl, Br, O, S and/or Se nonmetals). In some designs, the atomic ratio of all the present nonmetals (e.g., O, S, Cl, Se and/or others) to F in the fluoride-based cathode material composition (e.g., the atomic ratio of O:F or the atomic ratio of (O and Cl and S and Se):F, etc.) may range from around $10^{-20}$ to around $7 \cdot 10^{-1}$. In some designs, the ratio of all the present non-Li metal atoms except for Cu, Ni and Fe (e.g., Mn, La, Al, H, Mg, Zr, Cr, Bi, etc.) to the sum of the Li, Cu, Ni and Fe atoms in the cathode material composition may range from around $10^{-20}$ to around $3 \cdot 10^{-1}$.

While the description below may describe certain cathode examples (for use in combination with melt-infiltrated and other suitable solid electrolytes) in the context of Li storage in the cathodes based on the transition metal (such as Cu, Fe, Mn, Ni, Bi, Co, etc.) reduction-oxidation (redox) reactions, it will be appreciated that various aspects may be applicable to materials where a portion of Li storage relies on the anion (such as oxygen, O, etc.) redox reactions in the cathodes. Examples of such materials may include various conversion-type or intercalation-type or mixed-type cathode active materials that comprise both fluorine and at least one non-fluorine electronegative element that may exhibit multiple oxidation states, such as oxygen. In some designs, other (more rare) illustrative examples of such materials include those that in addition to metal(s) and fluorine also comprise sulfur or chlorine or other multivalent anions and their various combinations, etc.

While the description below may describe certain cathode examples (for use in combination with melt-infiltrated and other suitable solid electrolytes) in the context of "pure" conversion-type chemistry or "pure" intercalation-type chemistry of active cathode materials, it will be appreciated that various aspects may be applicable to mixed intercalation/conversion type active materials where both intercalation and conversion mechanisms of Li ion storage may take place during battery cell operation. Furthermore, in some designs, primarily (e.g., about 50-100%) intercalation-type mechanism(s) of Li ion storage may take place during some range of the cell charge or discharge (as an illustrative but not limited example, from around 0.0% to around 40.0% of the full discharge capacity). Similarly, in some designs, primarily (e.g., about 50-100%) conversion-type mechanism (s) of Li ion storage may take place during some range of the cell charge or discharge (as an illustrative but not limited example, from around 0.5% to around 100.0% of the full discharge capacity).

While the description below may describe certain anode examples (for use in combination with melt-infiltrated and other suitable solid electrolytes) in the context of "pure" conversion-type chemistry or "pure" intercalation-type chemistry or "pure" metal (e.g., Li) deposition chemistry or "pure" Li alloy chemistry of active anode materials, it will be appreciated that various aspects may be applicable to mixed type active materials where two or more of (e.g., (a) intercalation-type, (b) conversion-type, (c) metal (e.g., Li) deposition and (d) metal (e.g., Li) alloying) mechanisms of Li ion storage in the anode may take place during battery cell operation. Furthermore, in some designs, primarily (e.g., about 50-100%) one mechanism of Li ion storage (e.g., intercalation-type or conversion-type or alloying-type) may take place during some range of the cell charge or discharge (as an illustrative but not limited example, from around 0.0% to around 40.0% of the full discharge capacity). Similarly, in some designs, primarily (e.g., about 50-100%) another mechanism type (e.g., conversion-type or alloying-type or metal (e.g., Li) deposition) of Li ion storage may take place during some range of the cell charge or discharge (as an illustrative but not limited example, from around 0.5% to around 100.0% of the full discharge capacity).

While the description below may describe certain examples of Li-ion batteries without LiF-comprising cathodes and without Si-comprising anodes (for use in combination with melt-infiltrated and other suitable solid electrolytes), it will be appreciated that various aspects may be applicable to battery cells comprising Si in the anodes or LiF in the cathodes or both.

While the description below may describe certain examples in the context of Li-ion or Li-metal batteries or Li-ion cathodes, it will be appreciated that other metal- or metal-ion batteries (e.g., Na-ion, K-ion, Cs-ion, Ca-ion, Ba-ion, Zn-ion, Mg-ion, Al-ion, Na metal, K metal, Cs metal, Ca metal, Ba metal, Zn metal, Mg metal, Al metal, etc.) may be utilized in some designs. For example, in some designs, a solid-state Na-ion battery (SSNB) cell may be designed exhibiting a similar composition and/or produced by a similar method (or combination of methods), except that Li may be substituted by Na in the electrolyte and electrode compositions. In some designs, other Na-ion cathodes (e.g., Prussian White analogs) may be utilized in the SSNB construction.

While the description below may describe certain examples in the context of particular electrode or electrode particle chemistry, composition, architecture and morphology, certain examples in the context of particular electrode synthesis steps or particular electrode particle(s) synthesis steps, certain examples in the context of particular electrode porosity or particular porosity of particles (within the electrode), certain examples in the context of particular shape or particular size of particles (within the electrode), certain examples in the context of particular electrode surface chemistry or surface morphology, certain examples in the context of particular electrolyte composition, certain examples in the context of particular electrolyte incorporation into an electrode or a battery cell, it will be appreciated that various aspects may be applicable to battery cells that advantageously incorporate various combinations of some of the described electrode chemistries, composition, architecture, size, porosity and shape as well as electrolyte composition and electrode or cell manufacturing techniques.

While the description below may describe certain examples of separators composed only of the solid electrolyte material or in the context of a particular thermally-stable porous separator chemistry (e.g., $Al_2O_3$, AlFO (or, more broadly, $AlF_xO_y$ where 2y+1x=3), AlO(OH), $Al(OH)_3$, $LiAlO_2$, $LiAl_5O_8$, MgO, $MgF_{x1}O_{y1}$ where $2y_1+1x_1=2$, ZrO, $ZrF_{x1}O_{y1}$ where $2y_1+1x_1=2$, other metal oxides and oxyfluorides, thermally stable polymers coated or polymers coated with or infiltrated with ceramic, their various mixtures and combinations, etc.) or morphology (e.g., particles, nanoparticles, fibers, nanofibers, nanowires, whiskers, nanoflakes, nanoplatelets, platelets, nanoparticles of irregular shape, etc.; nonwoven, etc.) for use in combination melt-infiltrated electrolyte compositions, it will be appreciated that various aspects may be applicable to other types or chemistries or morphologies of thermally stable separators and also to the lack of standalone separators.

While the description below may describe certain examples of the electrolyte composition and properties for melt-infiltration into a separator or a cathode or an anode or their various combinations (including melt-infiltration into a battery stack or roll, etc.), it will be appreciated that various aspects may be applicable to the electrolytes of the described compositions or properties that are incorporated into cells by other (not melt-infiltration) means (e.g., as standalone or electrode-coated membranes, as current collector-deposited/coated layer, by solution infiltration, by slurry casting, by sputtering, by spraying, by electrodeposition, by electroless deposition, by layer-by-layer deposition, by various vapor deposition means (such as chemical vapor deposition CVD, physical vapor deposition PVD, atomic layer deposition ALD, etc.), among others).

While the description below may describe certain examples in the context of melt-infiltration electrolyte filling methodologies for cell fabrication, it will be appreciated that various aspects may be applicable to other methodologies of electrolyte filling (or, more generally, electrolyte incorporation) for cell fabrication.

While the description below may describe certain examples of electrolyte composition(s) that may be used to attain certain suitable electrolyte properties for effective cell (e.g., Li or Li-ion cell) design, it will be appreciated that in some designs other electrolyte compositions may be selected in order to achieve suitable electrolyte properties for cell design and manufacturing.

While the description below may describe certain examples of cells (e.g., Li or Li-ion cells, Na or Na-ion cells, etc.) comprising a single electrolyte, it will be appreciated that two or more distinct electrolyte compositions may be used within an individual cell.

While the description below may describe certain examples of cells (e.g., Li or Li-ion cells) comprising only a solid (e.g., at room temperature) electrolyte, it will be appreciated that various aspects may be applicable to cells comprising both solid and liquid electrolyte(s) (e.g., at room temperature).

While the description below may describe certain examples of cells (e.g., Li or Li-ion cells) comprising only inorganic solid (at room temperature) electrolyte, it will be appreciated that various aspects may be applicable to cells comprising organic (e.g., solid polymer or polymer gel or other types of organic) or mixed (organic-inorganic) electrolyte(s). In some designs, organic electrolytes or mixed electrolytes may comprise ionic liquid(s) (ILs).

For example, in one or more embodiments of the present disclosure the polymer, polymer gel or mixed polymer-ceramic electrolytes may exhibit mostly single Li-ion conducting properties in which anion anchored to the backbone or side chain of a polymer may be utilized. A specific example of the anion anchored group may comprise imide, sulfonamide, carboxylate and/or sulfonate. In some embodiments, the single Li-ion conducting properties might be achieved by utilizing ceramic particles in polymer ceramic composite in which anion anchoring goes through the interaction with ceramic surface. In some embodiments, the single Li-ion conducting polymers or ionomers may exhibit a transference number in the range from about 0.8 to about 1.0 (unity). Illustrative examples of ionomers in the polymer may include, but are not limited to, polymers functionalized Li-imide, Li-sulfonamide, Li-carboxylate, or Li-sulfonate groups in backbone or in side-chain positions. In some embodiments, the polymer, polymer gel or mixed polymer-ceramic electrolytes may comprise and/or may be capable of ionically conducting various cation groups. In some designs, the cation groups may comprise Li-ion, Na-ion, K-ion, Cs-ion, Ca-ion, Ba-ion, Zn-ion, Mg-ion, Al-ion, or other metal ions. In some embodiments, the ionomers may preferably exhibit thermally stable properties (not losing more than about 5-15 wt. % upon heating in an inert environment) in the temperature range from about 100 to about 350° C.

While the description below may describe certain examples of electrode binders as those comprising polyvinylidene fluoride (PVDF) polymer or polyamideimide (PAI) polymer or their mixtures, it will be appreciated that various aspects may be applicable to electrode binders comprising other polymer compositions or their mixtures with adequate thermal stability for cell fabrication at suitable elevated temperatures.

In one or more embodiments of this invention, at least a portion of the polymer binder composition may be deposited using physical vapor deposition, spray drying or solution deposition. In some embodiments, the ionomers may preferably exhibit thermally stable properties (not losing more than 5-15 wt. % upon heating in an inert environment) in the temperature range from about 100 to about 450° C.

In some designs, at least one of the electrodes (e.g., cathode electrode, anode electrode, or both) may comprise one, two or more sufficiently thermally stable polymer binders selected from the group of: PVDF, PAI, polyether (ether)imide (PEI), polyether ether ketone (PEEK), an aramid polymer, co-polyimide, poly(imide-co-amide), poly (imide-co-siloxane), polyester imide, polybenzimidazoles, polybenzothiazole, polybenzoxazoles, polybisthiazoles, polyhydrazides, polyqunaxolines, or other polyheterocycles polymers.

While the description below may describe certain examples of cells (e.g., Li or Li-ion cells) that comprise electrolyte that is solid at room temperature and is solid at operating temperatures, it will be appreciated that various aspects may be applicable to cells comprising electrolyte that is solid at room temperature, but may become viscous glass or liquid or semi-molten at least at some operating temperatures.

While the description below may describe certain specific illustrative examples of melt-infiltrated solid electrolyte compositions (e.g., those that comprise $Li_{1+x}Mg_xAl_{1-x}Cl_4$, $Li_2MgCl_4$, LiCl, $LiAlCl_4$ and/or their various mixtures, etc.), it will be appreciated that that in some embodiments melt-infiltrated solid electrolyte composition may also comprise LiF, $MgCl_2$, $ZrCl_4$, $YbCl_3$, $YCl_3$, $NbCl_5$, $Li_2ZrCl_6$, $Li_3YbCl_6$, $Li_3YCl_6$, or their various mixtures and solid solutions (e.g., instead of or in addition to $Li_{1+x}Mg_xAl^{1-x}Cl_4$, $Li_2MgCl_4$, LiCl, and/or $LiAlCl_4$ and/or their various mixtures with at least one of the halides selected from LiF, $MgCl_2$, $ZrCl_4$, $YbCl_3$, $YCl_3$, $NbCl_5$, $Li_2ZrCl_6$, $Li_3YbCl_6$, $Li_3YCl_6$) as well as IL(s).

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range. In yet another example, a numerical range with upper and lower bounds defined at different levels of precision shall be interpreted in increments corresponding to the bound with the higher level of precision. For example, a numerical percentage range from 30.92% to 47.4% (i.e., levels of precision in units or increments of hundredths and tenths, respectively) encompasses (in %) a set of [30.92, 30.93, 30.94, . . . , 47.39, 47.40], as if 47.4% (tenths) was recited as 47.40% (hundredths) and as if the intervening numbers between 30.92 and 47.40 in units or increments of hundredths were expressly disclosed.

Solid electrolytes may provide some advantages for Li and Li-ion cells, such as stability against oxidation at high cathode potentials, reduced undesirable side reactions between the cathode and electrolyte, reduced undesirable side reactions between the anode and electrolyte, and enhanced safety. Examples of known solid ceramic electrolytes include sulfide-based electrolytes (such as $Li_2S—P_2S_5$, $Li_2S—Ga_2S_3—GeS_2$, $Li_2S—SiS_2$, etc.), halide-based electrolytes, oxide-based electrolytes (such as Li—La—Ti—O garnet, Li—La—Ta—O garnet, Li—Si—O glass, Li—Ge—O glass, $Li_9SiAlO_8$, etc.), mixed sulfide-oxide electrolytes (such as $Li_2S—SiS_2—Li_4SiO_4$, $LiI—La_2O_2S—La_2O_2S_2$, etc.), oxy-chloride and oxy-hydro-chloride electrolytes (such as $Li_3OCl$ electrolyte, $Li_2OHCl$ electrolyte, $Li_3(OH)_2Cl$ electrolyte, etc.), borohydrides (such as $LiBH_4—LiCl$), and others.

It will be appreciated that the level of precision of any particular measurement, threshold or other inexact parameter may vary based on various factors such as measurement instrumentation, environmental conditions, and so on. Below, reference to such measurements or thresholds may thereby be interpreted as a respective value assuming a pseudo-exact level of precision (e.g., a threshold of 80% comprises 80.0000 . . . %). Alternatively, reference to such measurements or thresholds may be described via a qualifier that captures pseudo-exact value(s) plus a range that extends above and/or below the pseudo-exact value(s). For example, the above-noted threshold of 80% may be interpreted as "about", "approximately", "around" or "~" 80%, which encompasses "exactly" 80% (e.g., 80.0000 . . . %) plus some range around 80%. In some designs, the range encompassed around a measurement or threshold via the "about", "approximately", "around" or "~" qualifier may encompass the level of precision for which the respective measurement or threshold is capable of being measured by the most accurate commercially available instrumentation as of the priority date of the subject application.

Conventional solid electrolytes and solid state Li or Li-ion cells (batteries) typically suffer from various limitations, such as (i) low ionic conductivity (and thus low rate performance of solid cells), particularly at low temperatures (e.g., below around 0° C.); (ii) low practically-achievable energy density (e.g., due to the typically used milling procedure for the fabrication of electrodes with solid electrolytes, which requires excessive content of conductive additives and electrolyte for achieving reasonable rate performance and high capacity utilization); (iii) large thickness (e.g., typically above around 50 microns (μm)) of the electrolyte (separator) membranes (e.g., due to the typical formation of such solid membranes by sintering solid electrolyte powders), which increases the volume occupied by the inactive material, thus increasing cell cost and reducing cell energy density; (iv) the brittle nature of the ceramic solid electrolytes and solid-state batteries, which limits their applications and life; (v) the lack of flexibility in typical solid-state batteries with solid ceramic electrolytes, which limits their applications and life; (vi) typically rather high interface resistance between the solid electrolyte and the electrode materials (e.g., anode or cathode, or both), which limits their rate performance and temperature of efficient operation; (vii) often high reactivity of the solid electrolytes with many typically used electrode materials and current collectors (particularly for sulfide and chloride-comprising electrolytes), which may induce corrosion and other undesirable reactions during heating of the cell during fabrication or even during use at elevated temperatures (e.g., typically above around 50° C.); (viii) often high reactivity of many solid electrolytes with air and moisture, which often requires electrodes comprising solid state electrolyte to be produced in dry-rooms or gloveboxes (which may be prohibitively expensive for many applications and not practical); (ix) penetration of solid electrolytes by metal dendrites (e.g., Li dendrites in the case of Li metal batteries or Na dendrites in case of Na metal batteries or Al dendrites in case of Al metal batteries, etc.) during cycling, which may induce self-discharge, battery failure and/or safety hazards; (x) cracks and defects forming at the interface between the solid electrolyte and electrode materials (e.g., due to substantial volume changes (e.g., above around 2%) in many electrode materials during cycling, which most solid electrolytes fail to accommodate) leading to capacity fading, resistance growing and failures; (xi) various mechanical and electrochemical instabilities due to difficulty of the solid electrolytes to accommodate volume or shape changes in the electrode materials during cycling or electrochemical or chemical instabilities of the solid electrolyte in contact with metal anodes (e.g., Li or Na anodes), particularly in case of metal anode plating; (xii) in some cases, high toxicity of the products of the reaction of the solid electrolyte with moisture (e.g., during cell stack assembling or handling the solid electrolyte membranes in air); among others. In addition, conventional solid-state Li or Li-ion batteries cannot typically be used with conversion-type (including alloying-type) active electrode materials (due to the undesirable interactions with such materials and due to the dramatic volume changes in such active materials (e.g., about 15-400%), which cannot be accommodated by solid electrolytes in typical cells). Furthermore, some conventional solid-state Li-ion batteries cannot utilize graphite (or, more generally, carbon-based) anodes due to the poor interface (high resistance). Similarly, most conventional solid-state Li or Li-ion batteries often cannot be used with high voltage (greater than around 4 V vs. Li/Li+) cathode materials (e.g., with high voltage polyanion cathodes). In addition, conventional solid-state are often incorporated into cells as stand-alone membranes, which are extremely expensive to produce with sufficiently (for most applications) low areal density/concentration of defects (e.g., small cracks, small holes or pores, grain boundaries, excessive roughness on the surface, among others), which may lead to low cell fabrication yield and low cycle life. Finally, many conventional designs of the solid-state Li batteries require the use of liquid electrolyte in the cathode. Such designs often suffer from liquid electrolyte flammability, relatively low oxidation stability of the liquid electrolyte (particularly at high voltages), often undesired reactivity with the cathode material, often gassing, often leakage and/or other limitations. Conventional solid-state Li or Li-ion batteries (particularly with ceramic or inorganic solid-state electrolytes) cannot be produced in wound (e.g., cylindrical) configurations. One or more embodiments of the present disclosure are directed to routes (e.g., materials, cell designs and/or cell fabrication methodologies) to overcome (or at least reduce reduce) some or all of the above-noted limitations of conventional solid-state cells and solid-state electrolyte compositions.

One aspect of the present disclosure includes the use of mixed (a combination of two, three or more) polymer binder(s) in the same electrode and the use of mixed polymer-ceramic binders for thermally stable electrode materials. In one specific example, a mixture of PVDF (e.g., about 50 wt. %) and PAI (e.g., about 50 wt. %) may be used as a polymer binder.

Another aspect of the present disclosure includes the use of mixed metal oxides for the deposition of ceramic layer on the surface of the binder, conductive additives, active electrode materials and/or the whole electrode. Such mixed metal oxides may comprise two, three or more metals. In some designs, a layer of one or more metal oxide may be advantageously deposited on the surface of another one or more metal oxide to attain a unique combination of properties (e.g., good adhesion, more uniform coverage, better chemical stability, better resistance to dissolution into a molten or solid electrolyte, better electrochemical resistance, lower charge transfer resistance, etc.) that are either not attainable when using a single metal oxide layer or that not attainable when using the same deposition time or the same deposition thickness.

In some designs, instead of the (e.g., mixed) metal oxide (s), the ceramic layer on the surface of the binder, conductive additives, active electrode materials and/or the whole electrode may comprise metal oxy-fluoride or oxy-chloride or oxy-fluoro-chloride or oxy-nitride or oxy-fluoro-nitride or sulfide or selenide or oxy-sulfide or oxy-selenide or sulfoselenide or phosphide or other (e.g., ceramic) compounds comprising one or more of oxygen (O), fluorine (F), chlorine (Cl), nitrogen (N), sulfur(S), selenium (Se) and phosphorus (P).

In some designs, the metal oxide (or, more generally, ceramic) surface layer may advantageously comprise zirconium (Zr) metal, titanium (Ti) metal or hafnium (Hf) metal. In some designs, the metal oxide (or, more generally, ceramic) surface layer may advantageously comprise zinc (Zn) metal. In some designs, the metal oxide (or, more generally, ceramic) surface layer may advantageously comprise aluminum (Al) metal. In some designs, the metal oxide (or, more generally, ceramic) surface layer may advantageously comprise silicon (Si, semimetal). In some designs, such a layer may comprise yttrium (Y), lanthanum (La) or lanthanoids. In some designs, such a layer may comprise tungsten (W), niobium (Nb), molybdenum (Mo), tantalum (Ta) or chromium (Cr). In some designs, the layer may comprise iron (Fe). In some designs, the layer may comprise lithium (Li) or magnesium (Mg) or sodium (Na) or their combination in its composition. In some designs, the layer may comprise two or more of the following metals (in the amount exceeding 0.1 at. % relative to all metals and semimetals present in such a layer): Zr, Ti, Hf, Zn, Al, Si, Y, La, W, Nb, Fe, Mo, Ta, Cr, Cs, Li, Mg and Na.

In some designs, the average thickness of the metal oxide (or, more generally, ceramic) surface layer (e.g., on the surface of the binder, active material or conductive additives) may advantageously range from around 0.5 nm to around 50.0 nm.

In some designs, at least a portion of the metal oxide (or, more generally, ceramic) surface layer (e.g., on the surface of the binder, active material or conductive additives for improved thermal stability, chemical stability, electrochemical stability, wetting, etc.) may be advantageously deposited from the vapor phase (e.g., by means of ALD or CVD or other suitable techniques). In some designs, at least a portion of such a layer may be deposited by using a layer-by-layer deposition. In some designs, at least a portion of such a layer may be deposited by spraying, by electrodeposition or by electroless deposition.

In some designs, at least a portion of the protective or functional surface layer (e.g., comprising metal oxide or, more generally, ceramic material) may comprise one, two or more of the metals selected from the group of: Zr, Al, K, Cs, Fe, Be, Mg, Ca, Sr, Ba, Sc, Cr, Be, Y, La or non-La lanthanoids, W, Ta, Zr, Hf, and Nb.

In some designs, at least a portion of the protective or functional surface layer (e.g., comprising metal oxide or, more generally, ceramic material) may also comprise pores. Such pores may help accommodate interface stresses during cycling or provide other benefits.

In some designs, the protective or functional surface layer may be characterized as an interphase layer. In some designs, at least a portion of at least one of the electrode surfaces (e.g., anode electrode, cathode electrode, or both) may comprise the interphase layer (e.g., separating the respective electrode active material from direct contact with the SSE). In some designs, the interphase layer may comprise two or more metals from the list of: Zr, Al, W, K, Cs, Cr, Fr, Be, Mg, Ca, Sr, Ba, Sc, Y, La or non-La lanthanoids, Ta, Zr, Hf, and Nb. In some designs, the interphase layer may comprise a zirconium oxide or oxyfluoride, an aluminum oxide or oxyfluoride, or a combination thereof.

In some designs, the interphase layer may be deposited by ALD. ALD can be used to deposit very conformal, dense and uniform coatings. In some designs ALD may be preferable for the deposition on porous substrates (e.g., porous electrodes) in terms of very uniform and tightly controlled thickness of the deposited layer. In some designs, this thickness uniformity can be used to infer that ALD was used for the deposition of the interphase layer. Hence, ALD may be used to create interphase layers that could not practically be achieved using other deposition techniques, in some applications.

A conventional way to producing solid-state batteries (batteries comprising solid electrolyte) or batteries comprising mixed solid and liquid electrolytes comprise formation of a standalone solid-state electrolyte (SSE) membrane that separates anode and the cathode by preventing electrons from moving between them while allowing active ions (e.g., Li ions) to pass through. A conventional way to producing all solid-state batteries also comprises mixing active materials with solid electrolyte powders and conductive additives, casting the slurry onto the current collector and sintering these. Both of these conventional approaches are complex, expensive, and often suffer from low yield and limitations in terms of the attainable energy and power densities. For example, the volume fraction of active material in the conventionally produced solid state electrodes is often limited to about 25-60 vol. % to achieve a satisfactory conductivity and rate performance. However, this is significantly lower than the about 65-90 (often 75-90) vol. % of active material found in certain electrodes for use with liquid electrolytes. Similarly, the SSE separator membrane is conventionally prepared by sintering or pressing the SSE into the solid membrane material, typically about 50-150 microns (μm) in thickness, which is higher than the about 6-20 micron (μm) membranes used in conjunction with liquid electrolytes. These limitations may significantly increase the volume needed to store energy and thus reduce the energy density of the solid-state cells with SSE. In many cases, lower energy density also leads to a higher price, which is also undesirable. In addition, in most conventional designs, the expensive application of very high pressures and temperatures (often in controlled environments) are required for the fabrication of fully dense solid-state batteries.

Various solutions for rechargeable all-solid-state lithium (Li) ion and Li metal batteries (ASSLBs) have been explored in hope to reduce cost, increase energy density and most importantly improve the safety of batteries for electric ground and aerial vehicles. Despite such potential advantages, currently explored ASSLB manufacturing technologies not only are fundamentally more expensive, but they fail to even match the volumetric performance characteristics of commercial high-energy cells.

Inorganic (e.g., ceramic) SSEs offer higher conductivities for faster charging and typically better (although still insufficient) resistance to Li dendrite penetration for improved ASSLB durability and safety than polymer SSEs. However, the high melting point of the majority of conventional ceramic SSEs in combination with their poor wetting on the surface of active materials typically requires unrealistically high (for low-cost mass production) pressure and temperature processing of the ASSLB cathodes to reduce their interfacial resistance to somewhat acceptable levels. The highest conductivity inorganic sulfide-based SSEs additionally suffer from very high reactivity with moisture and require electrode processing and cell assembling in an extremely dry environment, which increases fabrication costs further.

The poor volumetric energy storage characteristics of conventional ceramic ASSLBs are the result of the manner in which they are fabricated, which involves separate fabrications of sintered SSE membranes and sintered ASSLB electrodes, which are then sandwiched between current collectors and carefully sintered together. Because ceramic is brittle and comprises defects that may induce cracking under stresses during cell assembling and use, SSE membranes are typically made relatively thick (e.g., greater than about 100 μm, an order of magnitude thicker than porous polymer membranes used in commercial Li-ion cells), which takes extra space and mass. Because ceramic is hard and thus difficult to plastically deform, researchers need to use very large volume fractions of ceramic SSE in ASSLB cathodes to ensure all active particles are being surrounded by the electrolyte.

In one or more aspects of the present disclosure, ASSLB cells may be fabricated by melt infiltration. In melt infiltration, SSE compositions (also referred to as solid electrolyte compositions) are infiltrated into an electrode at elevated temperatures in a liquid (or molten) state and subsequently solidified during cooling. In some designs, SSE compositions having low melting points may be used for melt infiltration.

FIG. 1 is a lattice structure diagram of a lithium halide compound, $LiAlCl_4$ (abbreviated as LAC). $LiCl_6$ octahedra (104) and $AlCl_4$ tetrahedra (102) are shown.

Figure 2:
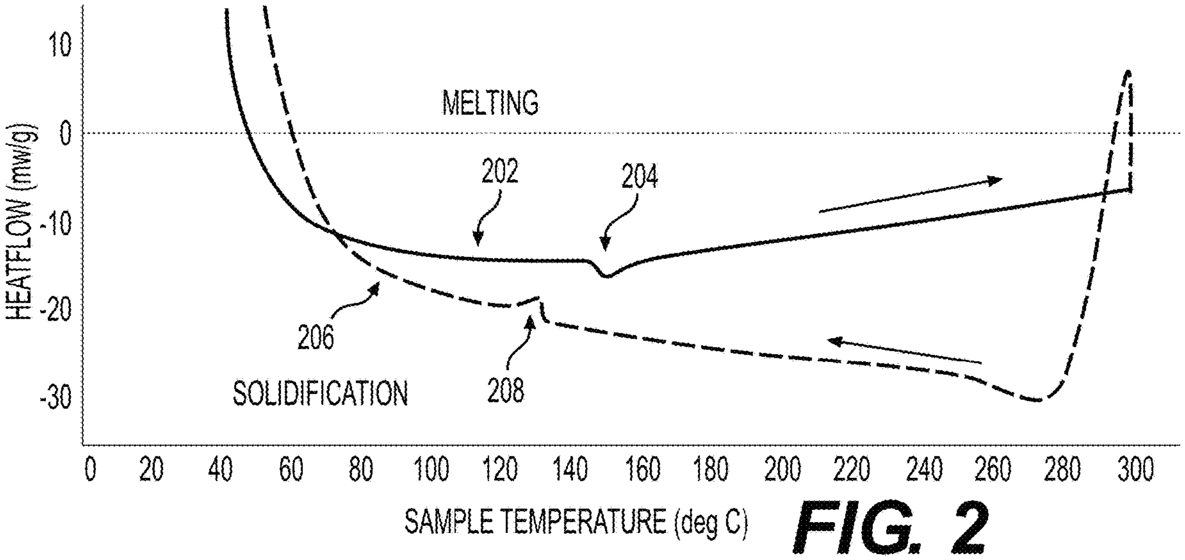
FIG. 2 is a differential thermal analysis (DTA) plot of a sample of $LiAlCl_4$ (LAC) showing a temperature increasing step 202 (shown as a solid line) and a temperature decreasing step 206 (shown as a dotted line). An endothermic peak 204 during the temperature increasing step 202 indicates that this LAC sample melts around 150° C. An exothermic peak 208 during the temperature decreasing step 206 indicates that this LAC sample solidifies around 135° C.

FIG. 2 is a differential thermal analysis (DTA) plot of a sample of $LiAlCl_4$ (LAC) showing a temperature increasing step 202 (shown as a solid line) and a temperature decreasing step 206 (shown as a dotted line). An endothermic peak 204 during the temperature increasing step 202 indicates that this LAC sample melts around 150° C. An exothermic peak 208 during the temperature decreasing step 206 indicates that this LAC sample solidifies around 135° C.

Figure 3:
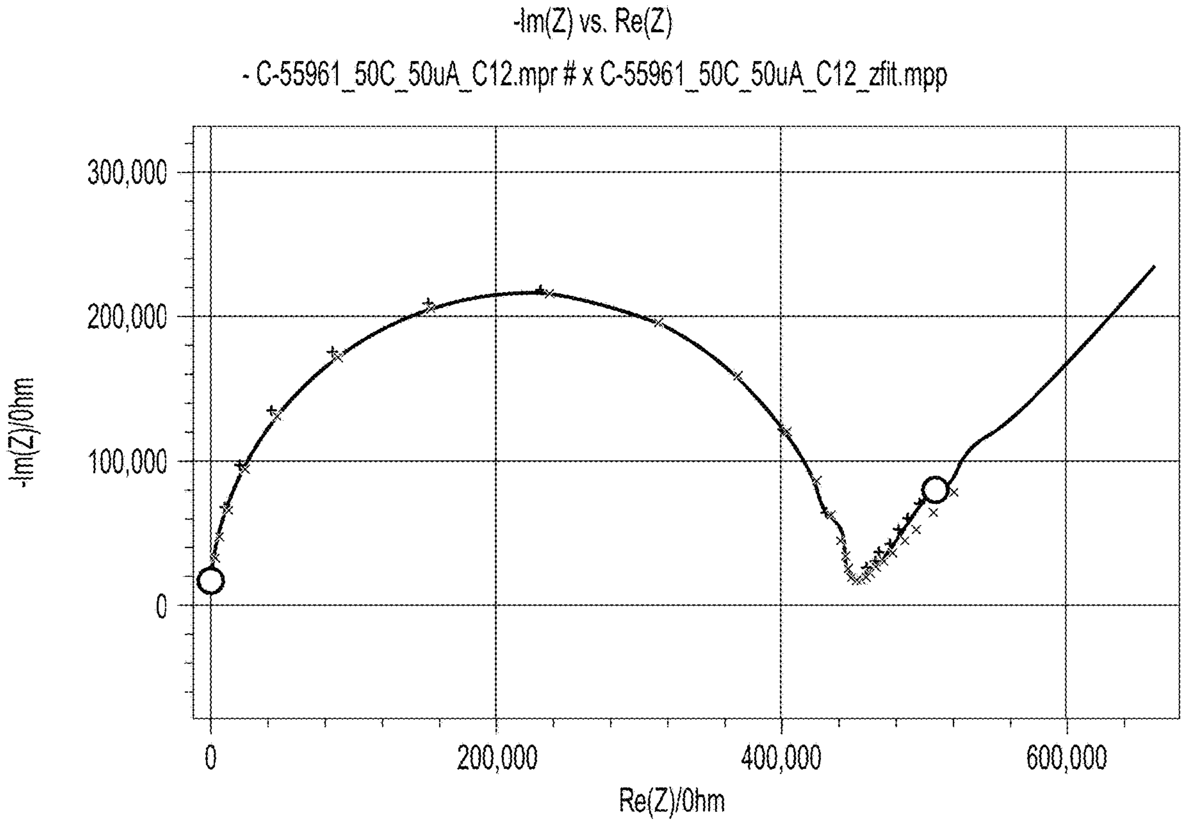
FIG. 3 is a galvanostatic electrochemical impedance spectroscopy (GEIS) plot of a sample of $LiAlCl_4$ (LAC) measured at around 50° C. A curve fit yields a conductivity of around $2\times10^{-6}$ S/cm.

FIG. 3 is a galvanostatic electrochemical impedance spectroscopy (GEIS) plot of a sample of $LiAlCl_4$ (LAC) measured at around 50° C. A curve fit yields an ionic conductivity of around $2\times10^{-6}$ S/cm.

Figure 4:
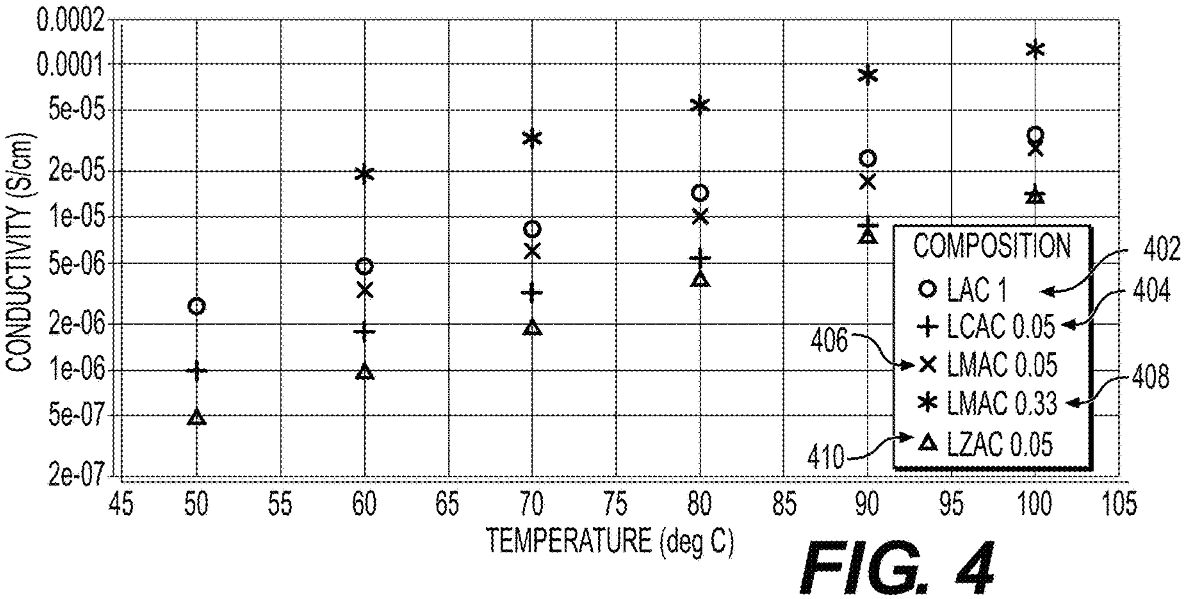
FIG. 4 is a graphical plot of the temperature dependence of lithium halide compounds as determined by GEIS. Ionic conductivity data of the following lithium halide compounds are shown: $LiAlCl_4$ (LAC) (402, circles); $Li_{1+x}Ca_xAl_{1-x}Cl_4$ where x=0.05 (LCAC 0.05) (404, + markers); $Li_{1+x}Mg_xAl_{1-x}Cl_4$ where x=0.05 (LMAC 0.05) (406, x markers); $Li_{1+x}Mg_xAl_{1-x}Cl_4$ where x=0.33 (LMAC 0.33) (408, * markers); and $Li_{1+x}Zn_xAl_{1-x}Cl_4$ where x=0.05 (LZAC 0.05) (410, triangles).

In addition to LAC, other lithium halide compounds having a formula $Li_{1+x}M_xAl_{1-x}Cl_4$ where M is selected from calcium (Ca), magnesium (Mg), and zinc (Zn) were synthesized and tested. FIG. 4 is a graphical plot of the temperature dependence of lithium halide compounds as determined by GEIS. Ionic conductivity data of the following lithium halide compounds are shown: $LiAlCl_4$ (LAC) (402, circles); $Li_{1+x}Ca_xAl_{1-x}Cl_4$ where x=0.05 (LCAC 0.05) (404, + markers); $Li_{1+x}Mg_xAl_{1-x}Cl_4$ where x=0.05 (LMAC 0.05) (406, x markers); $Li_{1+x}Mg_xAl_{1-x}Cl_4$ where x=0.33 (LMAC 0.33) (408, * markers); and $Li_{1+x}Zn_xAl_{1-x}Cl_4$ where x=0.05 (LZAC 0.05) (410, triangles). The ionic conductivities of LZAC and LCAC were found to be lower than that of LAC while the ionic conductivity of LMAC 0.33 was found to be greater than that of LAC by almost one order of magnitude. The ionic conductivity of LMAC 0.33 was approximately $2\times10^{-5}$ S/cm and the ionic conductivity of LAC was approximately $5\times10^{-6}$ S/cm at around 60° C. In some designs, the solid electrolyte is characterized by an ionic conductivity of approximately $1\times10^{-6}$ S/cm or greater at around 25° C.

Figure 5:
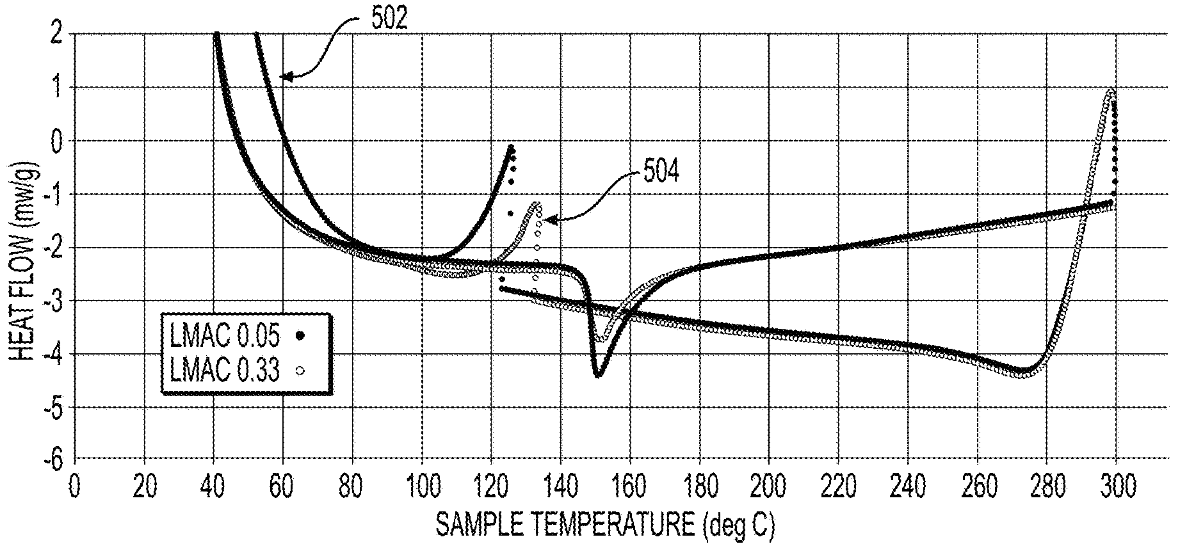
FIG. 5 shows differential thermal analysis (DTA) plots of LMAC 0.05 (line of solid circles, 502) and LMAC 0.33 (line hollow circles, 504) samples. Both samples are observed to melt around 156° C.

FIG. 5 shows differential thermal analysis (DTA) plots of LMAC 0.05 (line of solid circles, 502) and LMAC 0.33 (line of hollow circles, 504) samples. Both samples are observed to melt around 156° C. The endothermic peak of LMAC 0.33 is smaller than that of LMAC 0.05. This suggests that there is a greater portion of the LMAC 0.33 sample that does not melt. Because of their thermodynamic stability under typical processing conditions, LMAC 0.05, LMAC 0.33, and LAC can undergo melt-infiltration treatment at melt-treatment temperatures of approximately 160-200° C. or less: LAC, which has a melting temperature of around 150° C., can undergo melt-infiltration treatment at melt-treatment temperatures as low as around 150° C., and LMAC 0.05 and LMAC 0.33, which have melting temperatures of around 156° C., can undergo melt-infiltration treatment at melt-treatment temperatures as low as around 150° C. This relatively low melt-treatment temperature range facilitates melt infiltration at lower temperatures, thereby reducing any thermal damage to the electrodes and expanding the scope of compatible binder and electrode materials.

Figure 6:
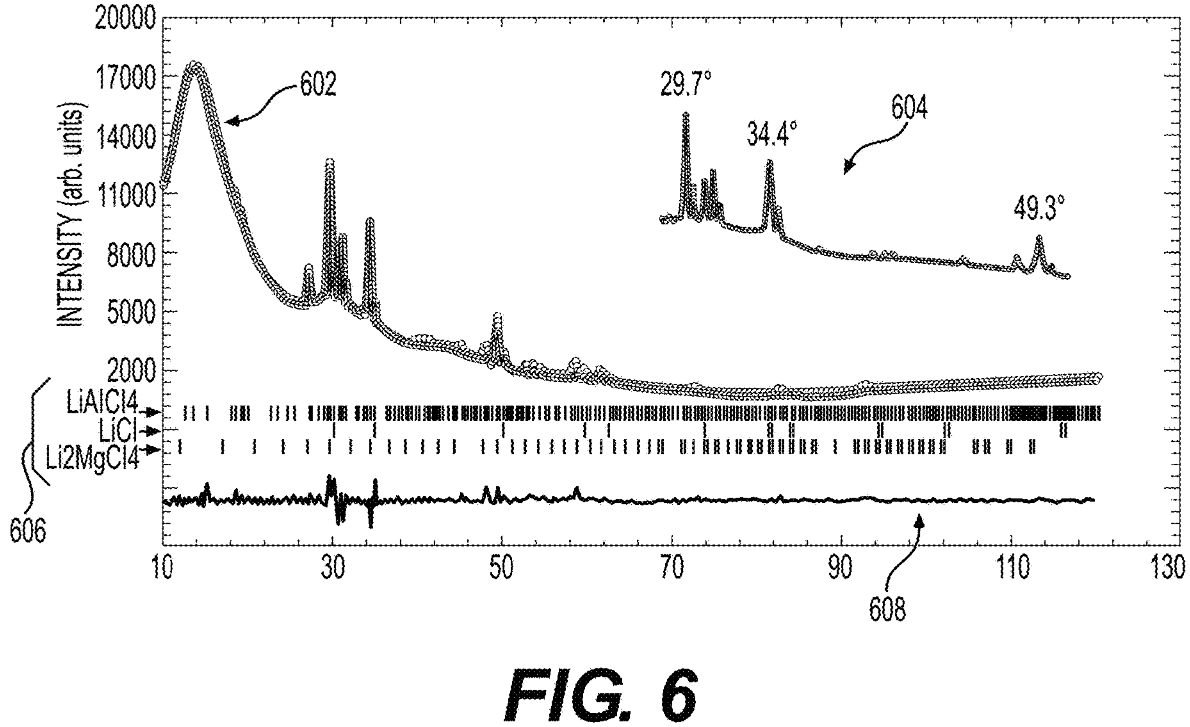
FIG. 6 shows x-ray powder diffraction data of an LMAC 0.33 sample. The horizontal axis shows 2θ and the vertical axis shows the diffraction intensity. The data are shown as circles (602). The Rietvelt fit to the x-ray data is shown as a line. A portion of the data is shown as an inset 604 to show some of the diffraction peaks (29.7°, 34.4°, and 49.3°) in greater detail. The inventors determined that LMAC 0.33 includes $LiAlCl_4$. LiCl, and $Li_2MgCl_4$ phases. Hashes 606 correspond to the positions of Bragg peaks associated with each of these phases. Plot 608 is a plot of the difference between the x-ray data and the Rietvelt fit.

FIG. 6 shows x-ray powder diffraction data of an LMAC 0.33 sample. The horizontal axis shows Bragg angle 2θ and the vertical axis shows the diffraction intensity. The data are shown as circles (602). Inset 604 shows the x-ray data in greater detail for Bragg angle 2θ ranging between around 29° to around 50°. A Rietveld-refined curve fit to the x-ray data using models (including lattice parameters and atomic positions) of LAC, LiCl and $Li_2MgCl_4$ was conducted. The modeled Bragg reflections of the $Li_2MgCl_4$ phase were found to match well to the observed Bragg peaks at 29.7°, 34.4°, and 49.3°. After the modeled peak intensities were calculated based on the atomic positions (Rietveld method), it was determined that $Li_2MgCl_4$ phase contributes to the intensities of those peaks. Accordingly. LMAC 0.33 contains three phases: $LiAlCl_4$, LiCl, and $Li_2MgCl_4$. Hashes 606 correspond to the positions of Bragg peaks associated with each of these three phases. Plot 608 is a plot of the difference between the x-ray data and the Rietvelt fit. It is likely that the presence of $Li_2MgCl_4$ in the LMAC 0.33 sample contributes to its ionic conductivity being greater than that of LAC because $Li_2MgCl_4$ exhibits a Li-ion conductivity of around $1\times10^{-5}$ S/cm at around 60° C.

In some ways, the melt-infiltration approach is similar to the low-cost fabrication of commercial Li-ion cells with liquid electrolyte, except that SSEs with relatively low melting points may be used to infiltrate into electrodes at moderately elevated temperatures (e.g., slightly above the melting point of the SSE) in a liquid state and then solidify during cooling.

Figure 13:
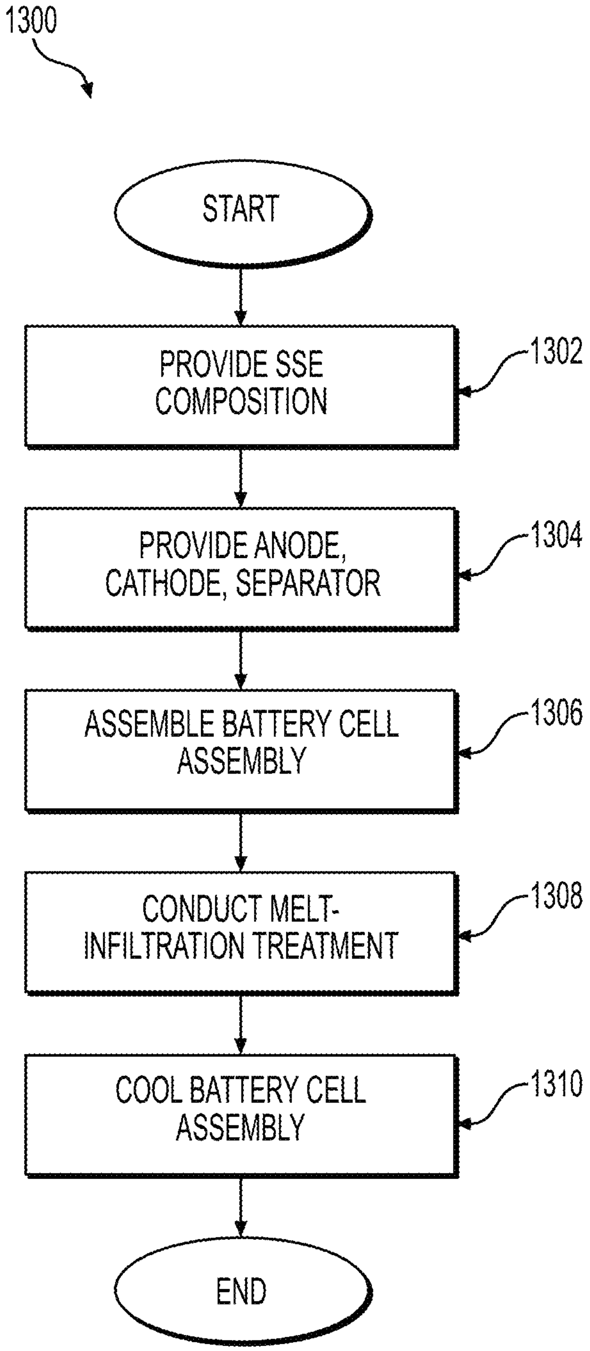
FIG. 13 is a flow diagram of a method of making a solid-state Li-ion battery cell in accordance with aspects of the present invention.
Figures 16A, 16B, 16C, 16D, 16E:
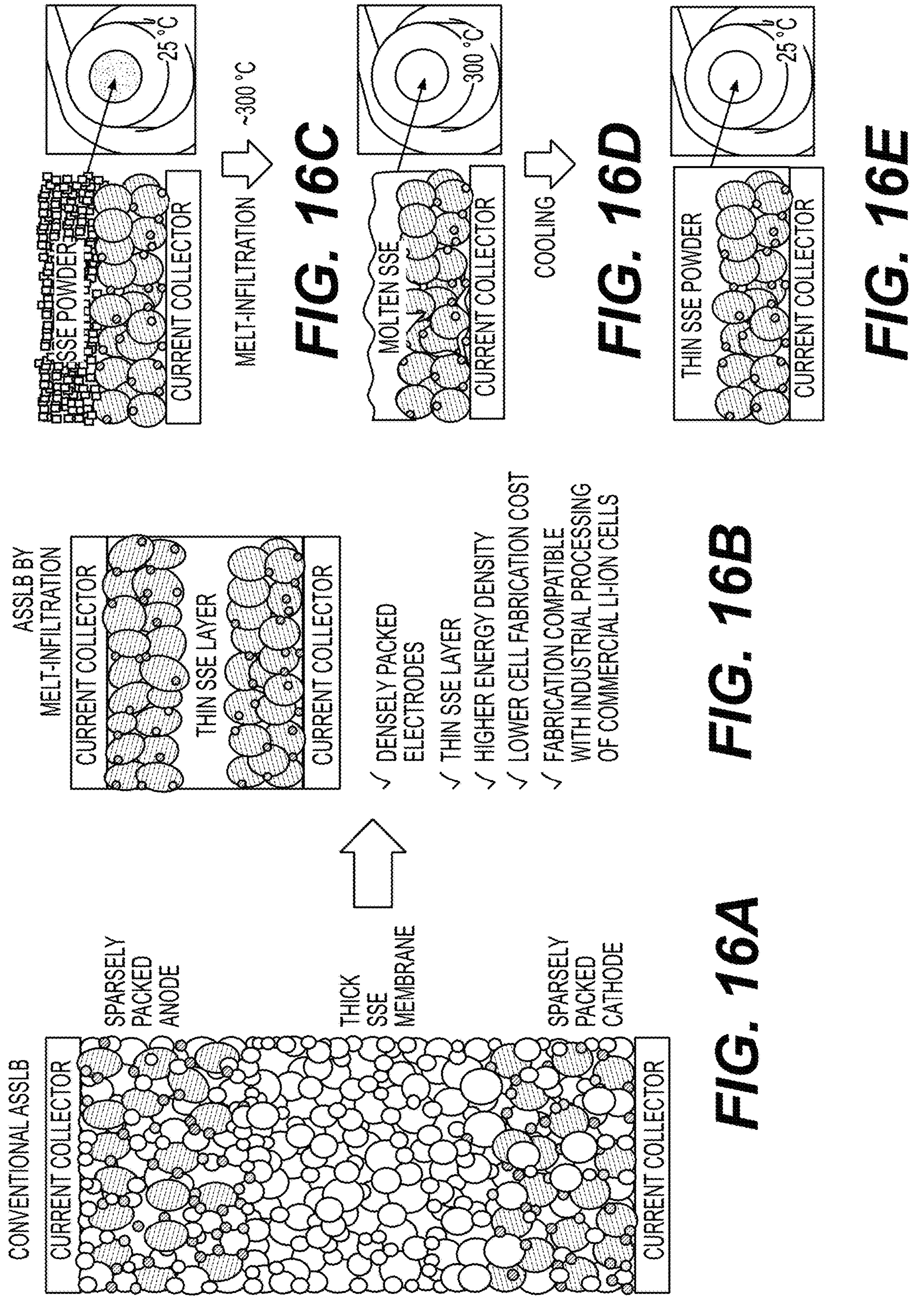
FIG. 16A illustrates a conventional ceramic all SSLB (ASSLB) cell.
FIG. 16B illustrates a ceramic ASSLB cell in accordance with an embodiment of the disclosure.
FIG. 16C illustrates a layer of SSE powder deposited on top of a slurry-cast electrode in accordance with an embodiment of the disclosure.
FIG. 16D illustrates heat-induced melting of the SSE of FIG. 16C as the SSE is infiltrated into the electrode by means of capillary forces in accordance with an embodiment of the disclosure.
FIG. 16E illustrates cooling and solidification of the SSE of FIG. 16D, facilitating formation of a dense electrode with a melt-infiltrated SSE in accordance with an embodiment of the disclosure.

Fabrication of a solid-state Li-ion battery cell according to a first embodiment is described with reference to FIG. 7 and FIG. 13. FIG. 13 shows a flow diagram of a method 1300 of making a solid-state Li-ion battery cell. Method 1300 includes steps 1302, 1304, 1306, 1308, and 1310. A layer of the SSE powder may be deposited on the top of a slurry-cast electrode (FIG. 16C), heat-induced melting of the SSE infiltrates it into the electrode by means of capillary forces (FIG. 16D), and cooling and solidification of the SSE enables formation of a dense electrode with a melt-infiltrated SSE (FIG. 16E). As such, in some designs, nearly the same commercial equipment as used for liquid electrolyte infiltration could be used for electrode and cell manufacturing in accordance with melt-infiltration of SSE, which reduces "barrier" for industry adoption. Melt-infiltration of SSE may also facilitate higher volumetric energy density and the formation of low-resistance interfaces between the SSE and active materials.

At step 1302, a solid electrolyte composition including a lithium halide compound is provided. In some designs, the lithium halide compound is selected from one or more of the following: $Li_{1+x}Mg_xAl_{1-x}Cl_4$, $Li_2MgCl_4$, LiCl, LiF, $MgCl_2$, $ZrCl_4$, $YbCl_3$, $YCl_3$, $NbCl_5$, $Li_2ZrCl_6$, $Li_3YbCl_6$, $Li_3YCl_6$, and $LiAlCl_4$ or their various mixtures and solid solutions. In some designs, the x in $Li_{1+x}Mg_xAl_{1-x}Cl_4$ (LMAC) can range between 0 and 1. LMAC samples with x=0.05 and 0.33 were synthesized and tested, and x=0.0 corresponds to $LiAlCl_4$ which was also synthesized and tested. Preferably, in some designs, x ranges between 0.0 and 0.33. X-ray diffraction studies showed that LMAC 0.33 contains $Li_2MgCl_4$, LiCl, and $LiAlCl_4$ phases.

At step 1304, battery cell components including an anode and a cathode are provided. The anode includes anode active material, and the cathode includes cathode active material. Optionally, the battery cell components include a separator. In some designs, the separator can be a thermally stable, porous separator. In some designs, the separator can be in the form of a nanofiber or nanowires. An example of a material used in such separators is $Al_2O_3$.

At step 1306, the battery cell components and the solid electrolyte composition are assembled to form a battery cell assembly. The solid electrolyte composition is interposed between the anode and the cathode in the battery cell assembly. FIG. 7 is a schematic side view of a battery cell assembly 700. Battery cell assembly 700 is held in position between two stainless steel discs 702, 704. Optionally, a jig can be used to apply pressure to the battery cell assembly via the two stainless steel discs 702, 704. An anode coating (anode) 724 is prepared on a bottom graphite current collector 714. The anode and bottom current collector 714 are positioned and oriented such that the bottom current collector 714 is positioned on top of (is in contact with) the bottom disc 704 and the anode 724 faces upwards. There is a polyimide sheet 728 in a ring form positioned on top of the bottom current collector 714, which serves to prevent electrical shorting between the top current collector 712 and the bottom current collector 714. A suitable amount of SSE powder 726 is positioned on top of the anode 724 and contacts the anode 724. A cathode coating (cathode) 722 is prepared on a top graphite current collector 712. The cathode and top current collector 712 are positioned and oriented such that the cathode 722 faces downwards (towards the anode 724) and contacts the SSE powder 726 and the top current collector 712 faces upward. Finally, the top stainless steel disk 702 is positioned on top of the top current collector 712.

At step 1308, a melt-infiltration treatment of the battery cell assembly is carried out. This step includes melting the solid electrolyte composition at a melt-treatment temperature such that the molten solid electrolyte composition infiltrates into at least a portion of the anode and at least a portion of the cathode (e.g., by placing the components in a furnace, etc.). Preferably, in some designs, the melting point of the solid electrolyte composition and/or the melt-treatment temperature is approximately 160-200° C. or less. In the example shown, the battery cell assembly 700 is held at approximately 160° C. for about 1 hr, under a pressure applied between the two stainless steel discs 702, 704.

At step 1310, the battery cell assembly is cooled to form the battery cell. The molten solid electrolyte composition solidifies upon cooling. The battery cell includes a solid electrolyte including the melt-infiltration solid electrolyte composition infiltrated in at least a portion of the anode 724 and at least a portion of the cathode 722. In some designs, the battery cell may be cooled to around 100° C. or below for testing.

Figure 14:
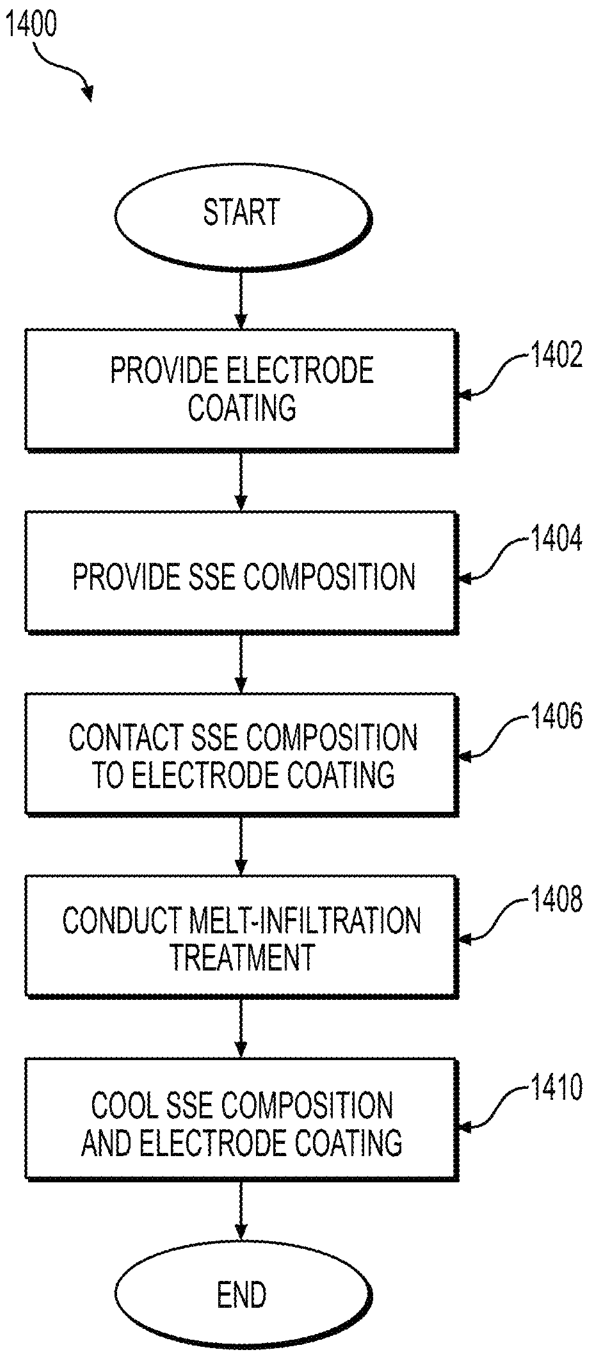
FIG. 14 is a flow diagram of methods of making an electrode (anode or cathode) for a solid-state Li-ion battery cell according to aspects of the present invention.

In some implementations, it is possible to carry out a melt-infiltration treatment on the anode and cathode before providing the electrodes at the foregoing step 1304. According to such an implementation, a solid electrolyte is melt-infiltrated in an anode and/or a cathode before they are assembled in a battery cell assembly (step 1306). FIG. 14 shows a flow diagram of a method 1400 of making a melt-infiltrated electrode (anode or cathode) for a solid-state Li-ion battery cell. Method 1400 includes steps 1402, 1404, 1406, 1408, and 1410.

At step 1402, an electrode coating (e.g., anode coating or cathode coating) including an electrode active material (anode active material if the electrode coating is an anode coating, cathode active material is the electrode coating is a cathode coating) is provided. For example, an electrode coating can be prepared on a current collector foil, such as a graphite current collector foil or stainless steel current collector foil or titanium current collector foil or nickel current collector foil or other suitable current collector foils. Illustrative examples of Li-based cathode active material include but are not limited to: lithium nickel cobalt aluminum oxides (NCA), lithium nickel cobalt manganese aluminum oxides (NCMA), lithium nickel oxides (LNO), lithium manganese oxides (LMO), lithium nickel manganese cobalt oxides (NCM), lithium cobalt oxide (LCO), lithium cobalt aluminum oxides (LCAO), lithium iron phosphate (LFP), lithium cobalt phosphate (LCP), lithium manganese phosphate (LMP), lithium manganese iron phosphate (LMFP), lithium vanadyl phosphate (LVOP), lithium nickel phosphate ($LiNiPO_4$), lithium vanadium fluoro phosphate ($LiVFPO_4$), lithium iron fluoro sulfate ($LiFeSO_4F$), various Li excess materials (e.g., lithium excess (rocksalt) transition metal oxides and oxy-fluorides such as $Li_{1.211}Mo_{0.467}Cr_{0.3}O_2$, $Li_{1.3}Mn_{0.4}Nb_{0.3}O_2$, $Li_{1.2}Mn_{0.4}Ti_{0.4}O_2$, $Li_{1.2}Ni_{0.333}T_{0.333}Mo_{0.133}O_2$ and many others), various high capacity Li-ion based materials with partial substitution of oxygen for fluorine or iodine (e.g., rocksalt $Li_2Mn_{2/3}Nb_{1/3}O_2F$, $Li_2Mn_{1/2}Ti_{1/2}O_2F$, $Li_{1.5}Na_{0.5}MnO_{2.85}I_{0.12}$, among others) and many other types of Li-comprising disordered, layered, tavorite, olivine, or spinel type active materials or their mixtures comprising at least oxygen or fluorine or sulfur and at least one transition metal and other lithium transition metal (TM) oxides or phosphates or sulfates (or mixed) cathode or anode materials that rely on the intercalation of lithium (Li) and changes in the TM oxidation state (including, but not limited to those that may be doped or heavily doped; including, but not limited to those that have gradient in composition or core-shell morphology; including, but not limited to those that may be partially fluorinated or comprise some meaningful fraction of fluorine (e.g., about 0.001-10 at. %) in their composition, etc.). In some designs, high-voltage lithium transition metal oxide (or phosphate or sulfate or mixed or other) cathodes may be used, where TMs and oxygen (O) are covalently bonded and both TM and O take part in electrochemical reduction-oxidation (redox) reactions during charge and discharge (including, but not limited to, those oxides or phosphate or sulfate or mixed cathodes that may comprise at least about 0.25 at. % of Mn, Fe, Ni, Co, Nb, Mg, Cr, Mo, Zr, W, Ta, Ti, Hf, Y, La, Sb, V, Sn, Si, or Ge), among others. Illustrative examples of lithium nickel manganese cobalt (NCM) oxides are: $LiNi_{1/3}Mn_{1/3}Co_{1/3}O_2$ (NMC111) and $LiNi_{0.8}Mn_{0.1}Co_{0.1}O_2$ (NMC811).

Illustrative examples of anode active material may include, but are not limited to: lithium titanate (LTO), lithium niobium oxide (LiNbO), lithium niobium molybdenum oxide (LiNbMoO), lithium niobium titanium oxide (LiNbTiO), various carbons (e.g., graphite, soft carbon, hard carbon, porous carbon, including carbon comprising closed pores not accessible to electrolyte, etc.), various metal oxides, silicon oxide, silicon nitride, silicon, various delithiated (before being used at step 1402) lithium metal oxides or phosphates (e.g., delithiated cathode active materials), various other metal or metal alloy anodes, to name a few. In some designs, the anode active material comprises one or more of lithium iron phosphate, lithium nickel cobalt aluminum oxide, and lithium titanate. In some designs, the cathode active material comprises one or more of iron phosphate, lithium nickel manganese cobalt oxide, and lithium nickel cobalt aluminum oxide. For example, LFP in delithiated form may be used as an anode active material.

At step 1404, a solid electrolyte composition including a lithium halide compound is provided. In some designs, the lithium halide compound may be selected from one or more of the following: $Li_{1+x}Mg_xAl_{1-x}Cl_4$, $Li_2MgCl_4$, LiCl, LiF, $MgCl_2$, $ZrCl_4$, $YbCl_3$, $YCl_3$, $NbCl_5$, $Li_2ZrCl_6$, $Li_3YbCl_6$, $Li_3YCl_6$, and $LiAlCl_4$ or their various mixtures and solid solutions. In some designs, the x in $Li_{1+x}Mg_xAl_{1-x}Cl_4$ (LMAC) may range between 0 and 1. In some designs, x may preferably range between 0.0 and 0.33. In some designs, the lithium halide compound is $Li_{1+x}Mg_xAl_{1-x}Cl_4$ and the x in $Li_{1+x}Mg_xAl_{1-x}Cl_4$ ranges between 0.0 and 0.33.

At step 1406, the solid electrolyte composition is brought into contact with the electrode coating. For example, a suitable amount of SSE powder may be positioned on top of the electrode coating.

At step 1408, a melt-infiltration treatment of the solid electrolyte composition and the electrode coating is carried out. This step includes melting the solid electrolyte composition at a melt-treatment temperature such that the molten solid electrolyte composition infiltrates into at least a portion of the electrode coating (e.g., by placing the components in a furnace, etc.). Preferably, in some designs, the melting point of the solid electrolyte composition and/or the melt-treatment temperature is approximately 160-200° C. or less. In one illustrative example, the solid electrolyte composition and the electrode coating are held at approximately 160° C. for about 1 hr.

At step 1410, the infiltrated molten solid electrolyte composition and the electrode coating are cooled to form the melt-infiltrated electrode. The electrode includes a solid electrolyte including the melt-infiltration solid electrolyte composition infiltrated in at least a portion of the electrode. The infiltrated molten solid electrolyte composition solidifies upon cooling. The resulting melt-infiltrated anode and/or cathode can be provided at step 1304.

Figure 11:
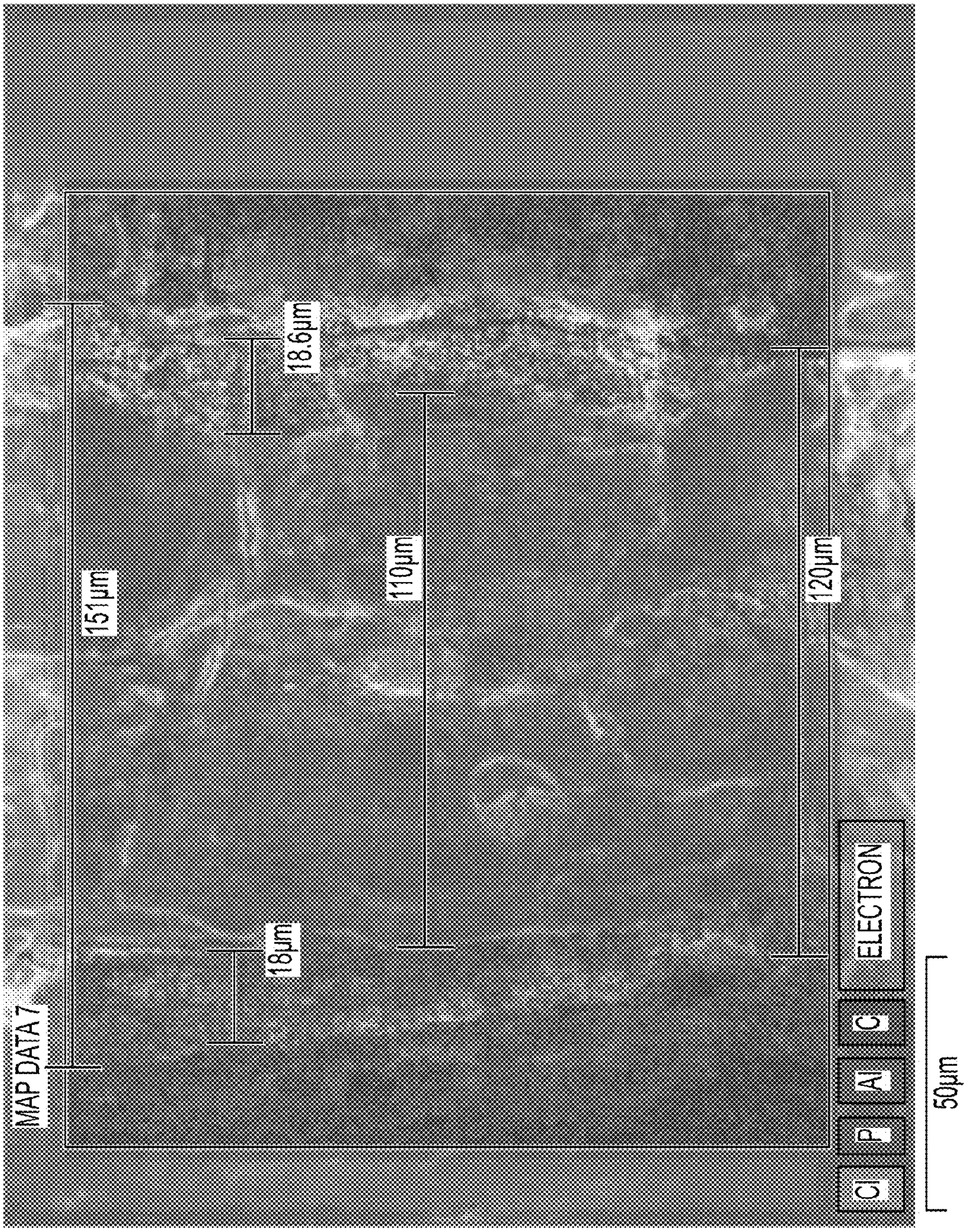
FIG. 11 shows a scanning electron microscopy (SEM) cross-sectional view of a solid-state Li-ion battery cell including a solid electrolyte and without any nanowire separator. Overlaid on the SEM cross section is an energy-dispersive x-ray spectroscopy (EDS) map of selected elements.

FIG. 11 shows an SEM cross-sectional view of a solid-state Li-ion battery cell. In the example shown, the anode active material was (delithiated) LFP and the cathode active material was LFP. Melt-infiltration treatment was carried out on the anode and the cathode according to method 1400, using $LiAlCl_4$ as the lithium halide compound in the melt-infiltration solid electrolyte composition. Subsequently, method 1300 was carried out, again using $LiAlCl_4$ as the lithium halide compound in the melt-infiltration solid electrolyte composition. No separator was used in the battery cell assembly (as shown schematically in FIG. 7). The SSE layer (shown in green) is approximately 110 μm thick. In other designs, the SSE may preferably range from approximately 2 μm to approximately 25 μm or from approximately 25 μm to approximately 50 μm or from approximately 50 μm to approximately 110 μm. Each electrode (shown in pink, indicating the presence of phosphorus) is approximately 18 μm thick on either side of the SSE layer. In other designs, the thickness of each electrode may preferably range from approximately 60 μm to approximately 110 μm or from approximately 30 μm to approximately 60 μm or from approximately 18 μm to approximately 30 μm. The melt-infiltration solid electrolyte composition is well-infiltrated into both electrodes and is also infiltrated into the graphite current collectors. Note the presence of green (mixture of yellow from Cl and blue from Al) in the current collector regions. This battery cell's cell impedance was measured, and the area specific resistance (ASR) was determined to be approximately 800 $\Omega\cdot cm^2$. This undesirably high ASR is attributable, at least in part, to the thick SSE layer (approximately 110 μm). In one or more aspects of the disclosure, a thinner SSE layer may be obtained by combining the solid electrolyte and a suitable separator.

A modified method incorporating the use of a separator is explained with reference to FIGS. 8 and 13. At step 1302, a solid electrolyte composition including a lithium halide compound is provided. (e.g., step 1302 is described above, and is not described further here for the sake of brevity). At step 1304, battery cell components including the optional separator are provided. In the working examples described below with respect to FIGS. 8 and 13, $Al_2O_3$ nanowire separators were used: the separator was approximately 30 μm in thickness (e.g., in some designs, a separator of approximately 30 μm or less may be used; in some designs, a separator membrane may be omitted altogether and the solid electrolyte itself may provide electrical separation between the anode and cathode), stable up to greater than approximately 500° C., and with a porosity of greater than 70%. In other implementations, suitable (e.g., nanowire or nanoparticles' containing) separators may exhibit smaller thickness (e.g., in the range from approximately 2-5 μm to approximately 25-30 μm).

At step 1306, the battery cell assembly additionally includes the separator interposed between the anode and the cathode in the battery cell assembly. Battery cell assembly 800 includes the separator 826 interposed between the anode 824 and the cathode 822 in the battery cell assembly 800. In the example shown, a melt-infiltration treatment has not been conducted on the anode 824 and the cathode 822. The SSE powder 832-834 (solid electrolyte composition) is interposed between the anode 824 and the cathode 822. Some of the SSE powder 834 is interposed between the anode 824 and the separator 826 and some of the SSE powder 832 is interposed between the cathode 822 and the separator 826.

At step 1308, a melt-infiltration treatment of the battery cell assembly is carried out. This step includes melting the solid electrolyte composition at a melt-treatment temperature such that the molten solid electrolyte composition infiltrates into at least a portion of the anode, at least a portion of the cathode, and at least a portion of the separator (e.g., by placing the components in a furnace, etc.). In some designs, it is important that the molten solid electrolyte composition infiltrates into an entire thickness of the separator to provide an ionic conduction pathway between the anode and cathode. Preferably, in some designs, the melt-treatment temperature is approximately 160° C. or less. In the example shown in FIG. 8, the battery cell assembly 800 may be held at approximately 160° C. for about 1 hr, under a pressure applied between the two stainless steel discs 702, 704.

At step 1310, the battery cell assembly is cooled to form the battery cell 840. The molten solid electrolyte composition solidifies upon cooling. The battery cell includes a solid electrolyte including the melt-infiltration solid electrolyte composition infiltrated in at least a portion of the anode 824, at least a portion of the cathode 822, and at least a portion of the separator 826. In some designs, it is important that the melt-infiltration solid electrolyte composition is infiltrated into an entire thickness of the separator to provide an ionic conduction pathway between the anode and cathode. In some designs, the battery cell 840 may be cooled to around 100° C. or lower for testing or use.

Figure 12:
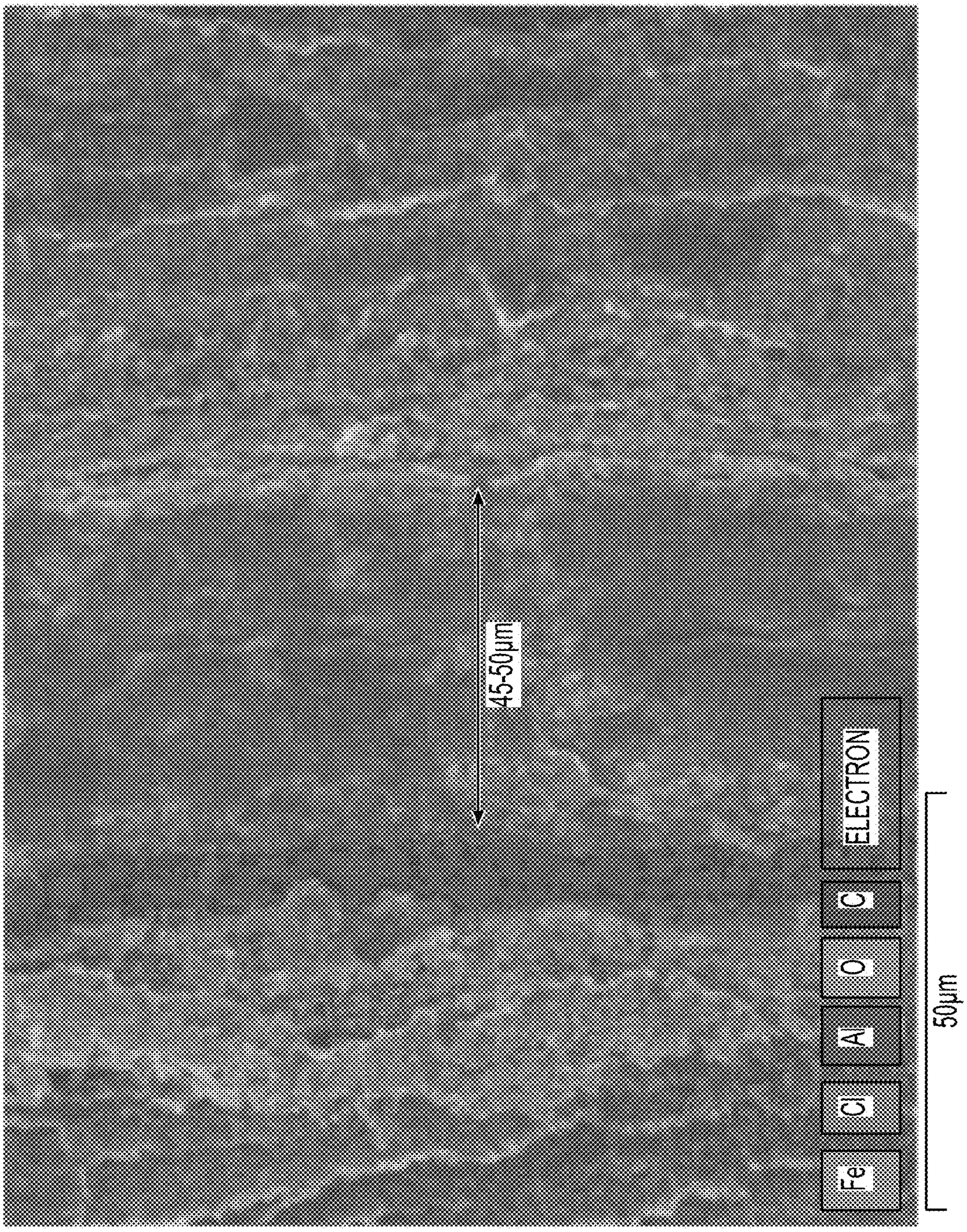
FIG. 12 shows an SEM cross-sectional view of a solid-state Li-ion battery cell including a solid electrolyte and $Al_2O_3$ nanowire separator. Overlaid on the SEM cross section is an EDS map of selected elements.

FIG. 12 shows an SEM cross-sectional view of another solid-state Li-ion battery cell including a melt-infiltrated separator. In the example shown, the anode active material was (delithiated) LFP and the cathode active material was LFP. Method 1300 (FIGS. 8 and 13) was carried out, using the $Al_2O_3$ nanowire separator (approximately 30 μm thick) and $LiAlCl_4$ as the lithium halide compound in the melt-infiltration solid electrolyte composition. The SSE layer (including the separator) is approximately 45~ 50 μm thick. In other implementations, SSE layer can be reduced to less than around 10 μm in thickness.

Figure 9:
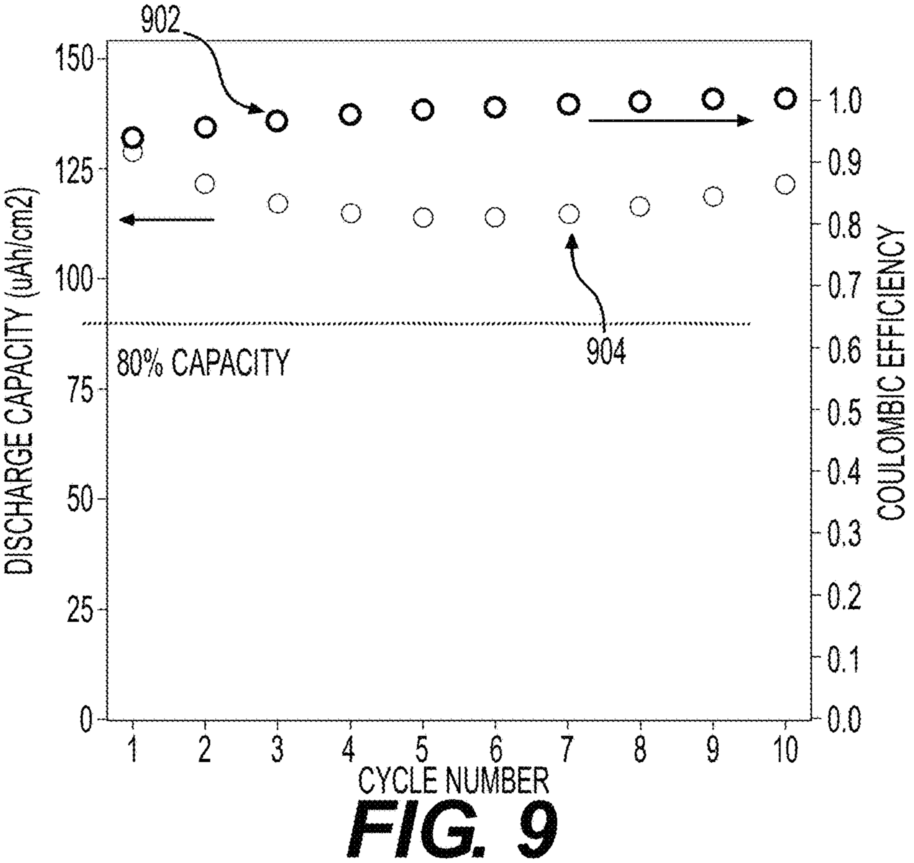
FIG. 9 shows a dependence of discharge capacity and coulombic efficiency as a function of cycle number for a solid-state Li-ion battery cell including a solid electrolyte and $Al_2O_3$ nanowire separator.

Cycling data of the solid-state Li-ion battery cell including LFP electrodes, $LiAlCl_4$ solid electrolyte, and an $Al_2O_3$ nanowire separator (FIG. 12) is shown in FIG. 9. FIG. 9 shows a dependence of discharge capacity expressed in $\mu Ah/cm^2$ (thick hollow circles 904, vertical axis on the left side) and coulombic efficiency (thick hollow circles 902, vertical axis on the right side) as a function of cycle number. These data points were compiled after the battery cell underwent three initial formation cycles during which significant capacity loss was observed. For the first 5 cycles, the discharge capacity decreased slightly with cycle number, and subsequently discharge capacity recovered to the approximate level of the discharge capacity at the first cycle. Coulombic efficiency increases gradually with cycle number suggesting relatively stable solid electrolyte interphase (SEI) formation.

Figure 10:
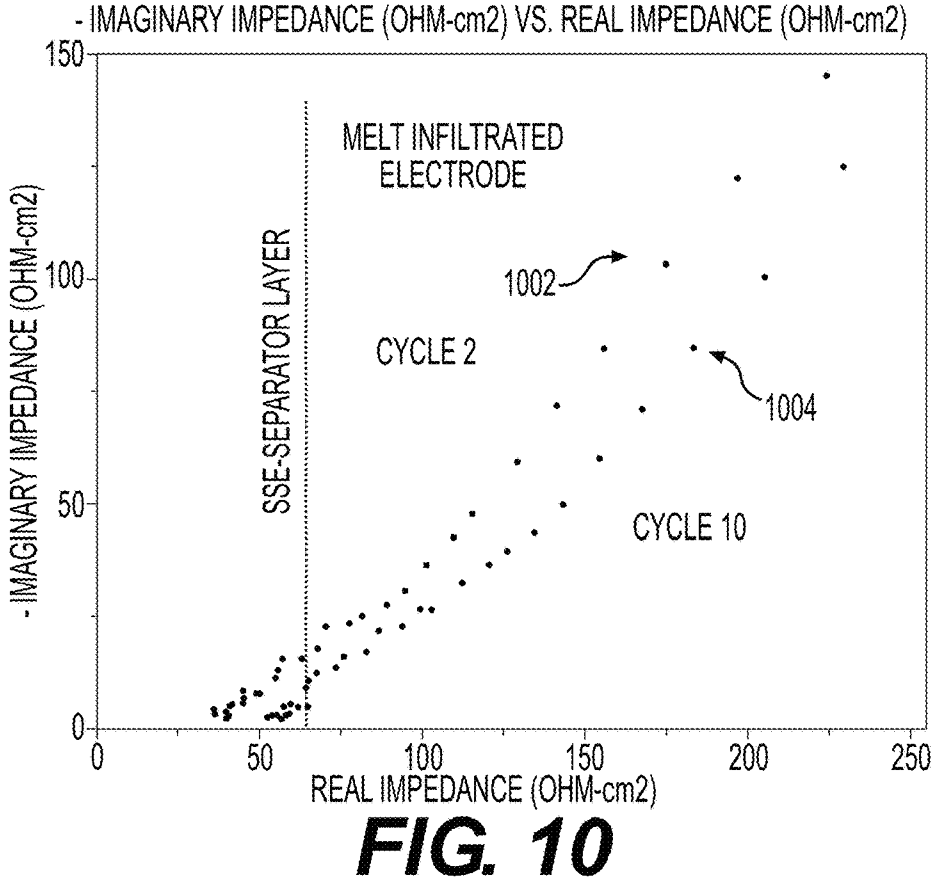
FIG. 10 shows cell impedance data (imaginary impedance on vertical axis, real impedance on the horizontal axis) of a solid-state Li-ion battery cell including a solid electrolyte and $Al_2O_3$ nanowire separator. In an aspect, the area specific resistance (ASR) for this battery cell may be around 50 $\Omega\cdot cm^2$. Cell impedance data is shown for the cell after cycles no. 2 and no. 10.

FIG. 10 shows cell impedance data for the solid-state Li-ion battery cell including LFP electrodes, $LiAlCl_4$ solid electrolyte, and an $Al_2O_3$ nanowire separator (FIG. 12). Imaginary impedance is plotted on the vertical axis and the real impedance is plotted on the horizontal axis. Impedance values are plotted for cycle number 2 (shown as data points 1002) and for cycle number 10 (shown as data points 1004). The area specific resistance (ASR) is estimated to be approximately 50 $\Omega \cdot cm^2$ for this cell with an $Al_2O_3$ nanowire separator and an SSE layer thickness (distance between the electrodes) of approximately 45-50 μm. In some designs, an area specific resistance (ASR) of the solid-state Li-ion battery cells in accordance with aspects of the disclosure may be approximately 100 $\Omega \cdot cm^2$ or less. For example, in some implementations, the ASR may be in a range of approximately 30 $\Omega \cdot cm^2$ to approximately 100 $\Omega \cdot cm^2$.

In another illustrative working example, a solid-state Li-ion battery cell was also made using NCA. In this case, NCA was used as the cathode and delithiated NCA was used as the anode. The battery cell assembly included an $Al_2O_3$ nanowire (nanofiber) separator and a $LiAlCl_4$ solid electrolyte and was assembled as schematically shown in FIG. 8. The cell was made with a capacity loading of around 1.3 $mAh/cm^2$. SEM/EDS analysis shows that there was excellent wetting between the LAC SSE and the NCA. However, the first cycle capacity was about half of the theoretical capacity and the capacity faded on cycling, likely attributable to a delamination of the anode from the current collector.

In another illustrative working example, a solid-state Li-ion battery cell was also made using LTO. In this case, the cell was an asymmetrical cell, in which NCA was used as the cathode and LTO was used as the anode. The battery cell assembly included an $Al_2O_3$ nanowire separator and a $LiAlCl_4$ solid electrolyte and was assembled as schematically shown in FIG. 8. The cell was made with a capacity loading of approximately 0.15 $mAh/cm^2$.

In some designs, an anti-perovskite SSE with a low melting point of about 300° C. and a low density of about 1.7 g $cc^{-3}$ may be used. In some designs, some other low-melting point (LMP) SSEs may also be configured with a relatively high conductivity (e.g., in the range from about $10^{-6}$ $S \cdot cm^{-1}$ to about $5\times10^{-3}$ $S \cdot cm^{-1}$ at about 60° C.) for relatively low melting point SSEs (e.g., below about 300-400° C. or, in some designs, below about 200° C.).

Similarly, in some designs, porous carbon (carbon comprising one or more pores, such as hollow or porous carbon (including but not limited by carbon doped and heavily doped by nitrogen, potassium, boron and other known dopants) particles or activated carbon or templated (e.g., by using soft or hard, such as oxide, templates or other pore-inducing templating means) porous carbon or carbon oxide or porous multi-layered graphene or graphene oxide particles or other porous particles may be used instead of LTO or graphite for the formation of lithium-metal batteries with such a solid electrolyte, where lithium metal is plated from the cathode into (e.g., internal) pores of the particles. In some designs, it may be advantageous for such porous carbon or carbon oxide or carbon nitride or other carbon-containing porous particles to exhibit good wetting by molten lithium metal (e.g., wetting angle between about 0.0 and about 90.0° at about 300° C., in some designs, from about 0.0 and about 65.0° at about 300° C.; in some designs, from about 0.0 and about 45.0° at about 300° C.). In some designs, the internal pores of such particles may comprise Li-alloying materials (e.g., Si or Al or Mg or Ge or Sn or Sb, etc.) that may either be used as nucleation sites for Li metal deposition during cell charging or be used to form Li alloys (such as Li—Si or Li—Al or Li—Mg or Li—Ge or Li—Sn or Li—Sb, etc.) during cell charging or both. In some designs, Li may be co-deposited from the electrolyte during charging with another metal (e.g., Al or Na or Mg or Ca or K, etc.). In some designs, metal other than Li may be co-deposited from the electrolyte during charging and act as a metal anode (e.g., Al or Na or Mg or Ca or K, etc.).

In some designs, the anode electrode may comprise porous anode particles (e.g., porous Si-comprising active material particles), where at least a portion of a pore volume of the porous anode particles is configured to accommodate volume expansion of Li during SSLB charging.

In some designs, at least one of the electrodes may be densified (be calendered) prior to electrolyte melt-infiltration. In some designs, the volume fraction of active material particles in the electrodes prior to SSE melt-infiltration may advantageously range from around 65 vol. % to around 98 vol. %. In some designs, the volume fraction of active material particles in the electrodes after the SSE melt-infiltration may advantageously range from around 60 vol. % to around 96 vol. %.

FIG. 16A illustrates a conventional ceramic ASSLB cell. The undesirable excess of the SSE in such cells as depicted in FIG. 16A contrasts sharply with commercial Li-ion cells where liquid electrolyte easily infiltrates into the smallest pores of a separator and between densely compacted active particles.

FIG. 16B illustrates a ceramic ASSLB cell in accordance with an embodiment of the disclosure. The ASSLB cell of FIG. 16B comprises an identical electrode loading as the ASSLB cell of FIG. 16A, except that the ASSLB cell of FIG. 16B is prepared by melt-infiltration and offers a higher energy density, reduced consumption of the SSE and cheaper manufacturing.

FIGS. 16C-16E illustrate the simplicity of the melt-infiltration process, where rapid heating of the SSE powder dry cast onto the surface of electrodes (FIG. 16C) to about 160-200° C. quickly melts the SSE powder (FIG. 16D). Through the capillary effect, the molten SSE rapidly infiltrates into the pores of the electrodes. The melt-infiltrated electrodes maintain the structure and rigidity with no observable delamination (FIG. 16E). In some designs, a modification of such a melt-infiltration process could be used in infiltrating stacked thermally stable anode/thermally stable separator/thermally stable cathode layers, where molten electrolyte is introduced/infiltrated into pre-heated stack or jelly roll or dry cylindrical, pouch, coin or prismatic cell (e.g., from the edge). In some designs, after melt infiltration by the molten electrolyte the cell may be rapidly quenched (e.g., cooled down to below the SSE solidification). In some designs, fast quenching rate (e.g., time within about 0.001 to about 30 see) may be advantageously utilized for rapid solidification. In some designs, such a rapid cooling may favor a favorable SSE phase formation or prevent formation of large crystals or enhance ionic conductivity or provide other benefits (e.g., lower resistance, better cell stability, etc.).

In some designs, a thermally stable porous separator melt-infiltrated with SSE may be advantageously used. Examples of materials used in such separators include, but are not limited to, $Al_2O_3$, AlFO (or, more broadly, $AlF_xO_y$ where 2y+1x=3), AlO(OH), $Al(OH)_3$. $LiAlO_2$, $LiAl_5O_8$, MgO, $Mg(OH)_2$, $MgF_{x1}O_{y1}$ where $2y_1+1x_1=2$, ZrO, $ZrF_{x1}O_{y1}$ where $2y_1+1x_1=2$, other metal oxides and oxyfluorides, thermally stable polymers coated or polymers coated with or infiltrated with ceramic, their various mixtures and combinations. In some designs, materials in such thermally stable separators may be in the form of linked particles or nanoparticles, fibers and nanofibers, nanowires, and whiskers, nanoflakes, nanoplatelets, platelets, nonwoven, and others.

In some applications, volume changes in active materials induce significant interface stresses in ASSLB cells and induce capacity decay. However, in some designs, the active material composition may be tuned so as to reduce or minimize such volume changes (e.g., keep them below around 6 vol. %, in some designs below around 3 vol. %, in some designs below around 1 vol. %), further improving the interface and attaining industry-level uniformity in the electrode fabrication and melt-infiltration. In some designs, the disclosed melt-infiltration technology provides various technical advantages, such as cells that can achieve very dense packing of the active cathode and anode particles in the inorganic all-solid electrodes in combination with simplicity of fabrication and compatibility with the current commercial Li-ion cell fabrication techniques.

In some designs, it may be advantageous to tune the SSE composition to reduce its melting point below about 350° C. In some designs, it may be even more advantageous to tune the melting point of the SSE composition to below about 300° C. In some designs, it may be even more advantageous to tune the melting point of the SSE composition below about 250° C. In some designs, it may be even more advantageous to tune the melting point of the SSE composition to below about 200° C. In some designs, it may be even more advantageous to tune the melting point of the SSE composition to below about 160° C.

In some designs, small amounts of inorganic solvents (e.g., sulfur dioxide, sulfuryl chloride fluoride, dinitrogen tetroxide, etc.) may be added into the SSE(s) in order to reduce their melting points or enhance their conductivity or both. Accordingly, in some designs, the inorganic solvent content can be one example mechanism by which the melting point of the SSE composition can be tuned as noted above (e.g., which may be used alone or in conjunction with other melting point tuning mechanisms).

In some designs, thermally stable ionic liquids (e.g., which remain in liquid phase at battery operational temperature, e.g., at or above around 50 to 80° C.) may be added into the SSE(s) in order to reduce their melting points or enhance their conductivity. Accordingly, in some designs, the thermally stable ionic liquid content is another example mechanism by which the melting point of the SSE composition can be tuned as noted above (e.g., which may be used alone or in conjunction with other melting point tuning mechanisms). Illustrative examples of suitable ionic liquids include, but are not limited to: 1-bytyl 3-methylimidazolium tetrafluoroborate, 1-ethyl 3-methylimidazolium tetrafluoroborate, 1-hexyl 3-methylimidazolium tetrafluoroborate, 1-butyl 2-methyl 3-methylimidazolium hexafluorophosphate, 1-butyl 2-methyl 3-methylimidazolium tetrafluoroborate, 1-methyl 2-methylimidazolium bis(trifluromethylsulfonyl) imide, 1-bytyl 3-methylimidazolium bis(trifluromethylsulfonyl)imide or other imidazolium-cation based ionic liquids and their various mixtures or derivatives.

In some designs, it may be advantageous for the solid-state Li or Li-ion (or other metal and metal-ion cells) cells (comprising, e.g., the anode electrode, the cathode electrode, etc.) to exhibit areal electrode capacity loadings of more than about 2 $mAh/cm^2$. In some designs, it may be advantageous for the solid-state Li or Li-ion cells (or other metal and metal-ion cells) to exhibit areal electrode capacity loadings in excess of about 3 $mAh/cm^2$. In some designs, it may be advantageous for the solid-state Li or Li-ion cells (or other metal and metal-ion cells) to exhibit areal electrode capacity loadings in excess of about 4 $mAh/cm^2$. In some designs, it may be advantageous for the solid-state Li or Li-ion cells (or other metal and metal-ion cells) to exhibit areal electrode capacity loadings in excess of about 5 $mAh/cm^2$. In some designs, it may be advantageous for the solid-state Li or Li-ion cells (or other metal and metal-ion cells) to exhibit areal electrode capacity loadings in excess of about 6 $mAh/cm^2$. In some designs, it may be advantageous for the solid-state Li or Li-ion cells (or other metal and metal-ion cells) to exhibit areal electrode capacity loadings more than about 7 $mAh/cm^2$.

In some designs, the cathode electrode may comprise nickel (Ni). In some designs, an atomic fraction of Ni in a composition of the cathode active material is more than about 80 at. %, relative to all transition metals in the cathode active material.

In some designs, it may be advantageous for the fabrication of solid-state Li or Li-ion cells to heat such cells at or above the melt-infiltration temperature in a reduced pressure environment (e.g., vacuum) prior and during electrolyte infiltration. In some designs, it may be advantageous to melt-infiltrate SSE into such cells under reduced pressure (e.g., vacuum) in order to greatly minimize and ideally completely avoid undesirable gas bubbles (or unfilled by electrolyte areas) within the electrode and to improve/accelerate melt-electrolyte infiltration. In some designs, it may be advantageous for the dry cell pressure during the SSE melt infiltration procedure to be below about 0.2 atm. In some designs, it may be advantageous for the dry cell pressure during the SSE melt infiltration procedure to be below about 0.1 atm. In some designs, it may be advantageous for the dry cell pressure during the SSE melt infiltration procedure to be below about 0.01 atm. In some designs, it may be advantageous for the dry cell pressure during the SSE melt infiltration procedure to be below about 0.001 atm.

In some designs, conducting the first charge or the first discharge or first charge-discharge cycle(s) in the melt-infiltrated solid-state Li or Li-ion cells (or other metal and metal-ion cells) at elevated temperatures (where SSE is either soft or molten or semi-molten) may be advantageous in terms of releasing some of the mechanical stresses, releasing some of the possible gasses and/or ensuring improved capacity utilization, improved cycle stability and improved rate performance of the SSE Li or Li-ion cells with the melt-infiltrated electrolyte. In some designs, it may be advantageous for the melt-infiltrated solid-state Li or Li-ion cells (or other metal and metal-ion cells) to undergo the first charge or the first discharge or first charge-discharge cycle(s) at above about ⅔ of the melting point of the SSE (in K). In this case the stresses (and the remaining strain or various cracks or defects, as could be detected by X-ray diffraction or Raman spectroscopy or electron microscopy techniques or other methods) originating from the volume expansion in the electrode materials may be significantly minimized. In some designs, it may be advantageous for the melt-infiltrated solid-state Li or Li-ion cells to undergo the first charge or the first discharge or first charge-discharge cycle(s) at or above the melting point of the SSE in order to further reduce such stresses and detectable defects and strain and improve stability and performance of cells. In some designs, it may be advantageous for the melt-infiltrated solid-state Li or Li-ion cells (or other metal and metal-ion cells) to undergo the first charge and first discharge or first charge-discharge cycle(s) at or above the melting point of the SSE.

In some designs, it may be advantageous for the fabrication of solid-state Li or Li-ion cells (or other metal and metal-ion cells) to have mechanically constrained (or compressed) dry cells prior to melt-infiltration with the SSE (e.g., to reduce or avoid cell expansion while the SSE is being melt-infiltrated). In this case, the electrode expansion and the related reduction in volumetric capacity during the melt-infiltration may be minimized or avoided.

In some designs, it may be advantageous for the melt-infiltrated solid-state Li or Li-ion cells (or other metal and metal-ion cells) to comprise a meaningful amount of conductive (e.g., $sp^2$-bonded) carbon in its fully charged anodes (e.g., above about 5 wt. % relative to the total mass of Li, active material(s), binder and conductive additives, but not including the mass of the current collector). For example, the anode electrode may comprise conductive sp2-bonded carbon in some designs.

WORKING EXAMPLES

Synthesis of Solid-State Electrolytes:

All the procedures described in this section were conducted inside an Ar-filled glovebox. The starting materials used for the synthesis of LAC ($LiAlCl_4$) were LiCl (Bioxtra, 99.98%, Sigma Aldrich) and $AlCl_3$ (anhydrous, 99.999%, Sigma Aldrich). Both precursors were dried at 100° C. for 24 hours under vacuum before each experiment. LiCl and $AlCl_3$ in the molar ratio of 1:1 were ball milled at 510 RPM for 20 hours with 1-1 cm steel ball (Fritsch Pulverisette 7 classic). The powders were used as is, or melted by heating to 165° C. The obtained solid-state electrolytes were ground into powder for characterizations and the melt-infiltration process.

Preparation of Electrodes:

$LiFePO_4$ (LFP), $LiNi_xCo_yAl_yO_2$ (NCA), $Li_4Ti_5O_{12}$ (LTO), pure black (PB), polyvinylidene fluoride (PVDF), polyamideimide (PAI), and N-methyl-2-pyrrolidone (NMP) were used. Slurries were prepared by mixing the active materials with carbon (pure black), PVDF, and PAI in NMP and then cast onto current collectors with a Dr. Blade to fabricate the electrode. To test high-temperature conditions for melt-infiltration (~165° C.), a mixture of the traditional poly(vinylidenedifluoride) (PVDF) with a thermally stable polyamideimide (PAI) was used as a blended binder, which enables the necessary toughness, high thermal and chemical resistance and dimensional stability, which is achievable due to the intermolecular hydrogen bonding between highly polarized $CH_2$ groups of PVDF and the C═O groups of PAI. For LFP cathodes, the wt. % ratio was LFP:PB:PVDF:PAI=95:1:2:2 and the current collectors were stainless steel or graphite foils. For NCA cathodes, the wt. % ratio was NCA:PB:PVDF=95:1:4 and the current collectors were stainless steel foils. For LTO anodes, the wt. % ratio was LTO:C:PVDF=94:3:3 (C=super P carbon) and the current collectors were stainless steel foils. All electrodes were dried at 80° C. for 12 hours after casting. The electrodes were punched into discs with ¼" (6.4 mm) or 5/16" (7.9 mm) in diameter for the melt-infiltration process. In some designs, one, two or more poly(ether)imide(s) (PEI), polyether ether ketone (PEEK), or aromatic polyamides or other thermally stable polymers (e.g., thermoplastic polymers with a melting point in excess of about 250° C.) may be used as a binder (or a component of a binder) instead of or in addition to PAI for the preparation of thermally stable anodes or cathodes for use in the SSE melt-infiltration procedures.

Some LFP and NCA electrodes were first charged to obtain a "delithiated" state. These electrodes were later assembled into symmetric cells using their lithiated counter parts. To delithiate the electrodes, the electrodes were assembled into half cells (vs. Li metal) with standard liquid electrolyte ($LiPF_6$ based). Current (~C/10 rate) was applied until the cells reached their target voltages −3.8 V (LFP) or 4.2 V (NCA). These delithiated electrodes were then washed in dimethyl carbonate (DMC) and dried at 80° C. prior to assembly into symmetric or full cells.

Figure 7:
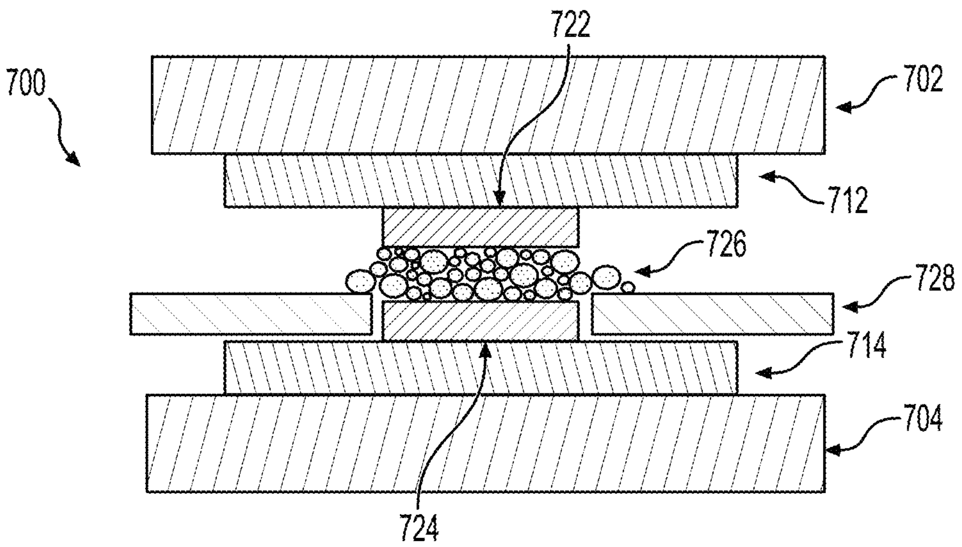
FIG. 7 is a schematic side view of a battery cell assembly according to aspects of the present invention.
Figure 8:
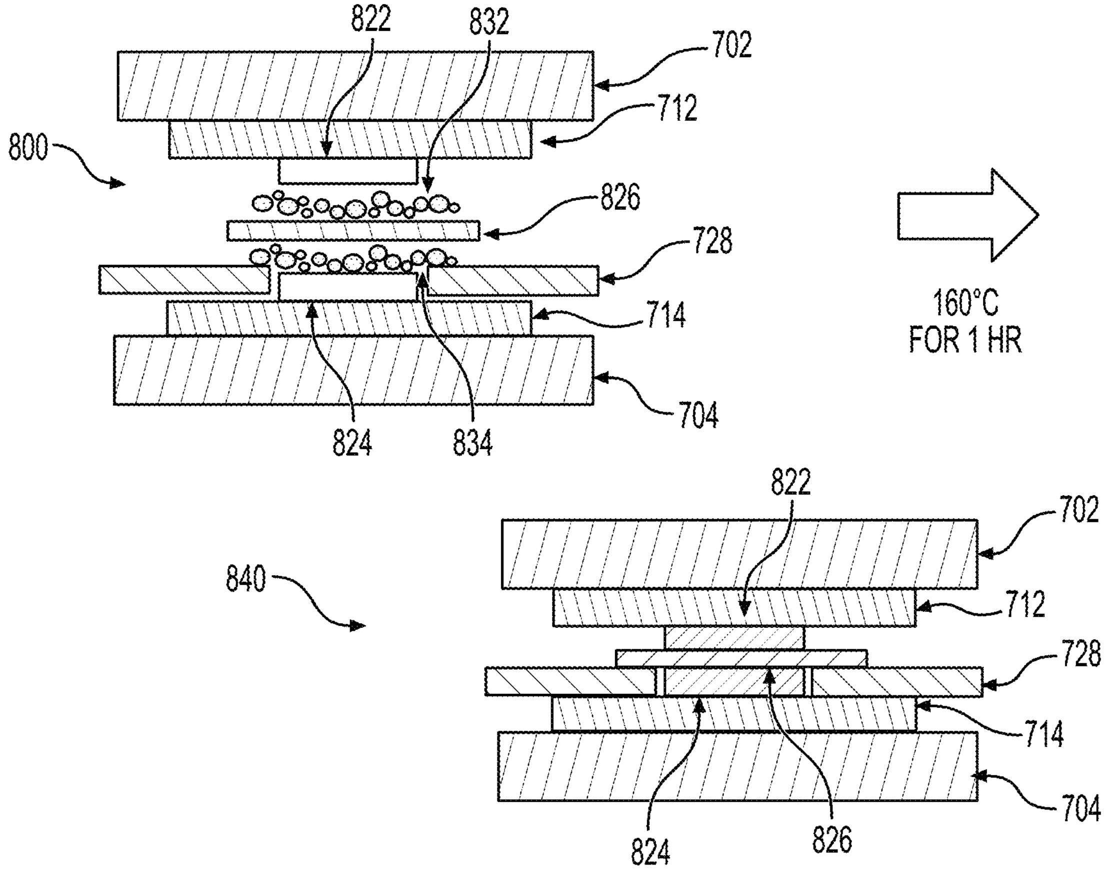
FIG. 8 shows a schematic side view of another battery cell assembly according to aspects of the present invention and a schematic side view of a battery cell made from it by a melt-infiltration treatment.

Melt-Infiltration Process and Fabrication of all-Solid-State Li-Ion Cells:

Melt-infiltration was conducted using two different cell stacks, which are depicted in FIGS. 7-8. In the first example (e.g., as shown in FIG. 7), electrodes are melt-infiltrated first by dispersing SSE powder on the electrode and then heating the electrode in a furnace to 165° C. Then the cell stack was assembled, in which more SSE powder is placed in between the melt-infiltrated electrodes. This entire stack was placed into a cell fixture (PAT CELL, EL-CELL) and heated to 165° C. In the second example (e.g., as shown in FIG. 8), the electrode stack was assembled with a nanowire separator placed between the electrodes and SSE powder placed between the nanowire separator and the electrodes. The entire stack was placed into a cell fixture (PAT CELL, EL-CELL) and heated to 165° C. Electrochemical testing was conducted after completing the melt infiltration process on the cell stack.

Note that in some designs, melt-infiltration of the molten solid electrolyte could also be conducted into pre-assembled cathode/separator/anode sandwich stacks (e.g., for a stacked cell pouch or stacked prismatic or stacked coin cell design) or cathode/separator/anode/separator rolls (e.g., for a wound pouch or wound prismatic or wound cylindrical or wound coin cell designs).

Characterizations:

Scanning electron microscopy (SEM) (Zeiss) was used to examine the cross-sections of the electrodes after melt-infiltration. Samples were first polished using an argon ion mill (Gatan, PECS II). Elemental distribution was obtained by energy dispersive spectrometer (EDS) mapping (Oxford Instruments). Differential thermal analysis (DTA) (Mettler Toledo) was performed to detect the melting point of the SSE. The temperature range was 25-300° C. with a ramp rate of 10° C. $min^{-1}$.

Electrochemical Measurements:

Electrochemical impedance spectroscopy (EIS) was used to measure the ionic conductivity of the SSE in symmetric cells. SSE powder was pressed into pellets (diameter ¼" (6.4 mm); thickness <1 mm) at room temperature with a pressing die. Then, the pellets were sandwiched by two identical current collectors (stainless steel or graphite), loaded into a cell fixture (PAT-CELL, EL-CELL). Electrochemical impedance measurements were taken between 1 MHz to 1 Hz at various temperatures (50, 60, 70, 80, 90, and 100° C.). Charge-discharge tests of the solid-state Li-ion cells were conducted on a multichannel VMP3 Potentiostat (Biologic) at 100 or 60° C. with various current rates. The cycling voltage ranges for the melt-infiltrated dLFP/SSE/LFP cells was 0.4-0.4 V. The cycling voltage ranges for the melt-infiltrated dNCA/SSE/NCA cells was 0.5-0.5 V. The cycling voltage range for the melt-infiltrated LTO/SSE/NCA cells was 2.6-1.2 V.

Figure 15:
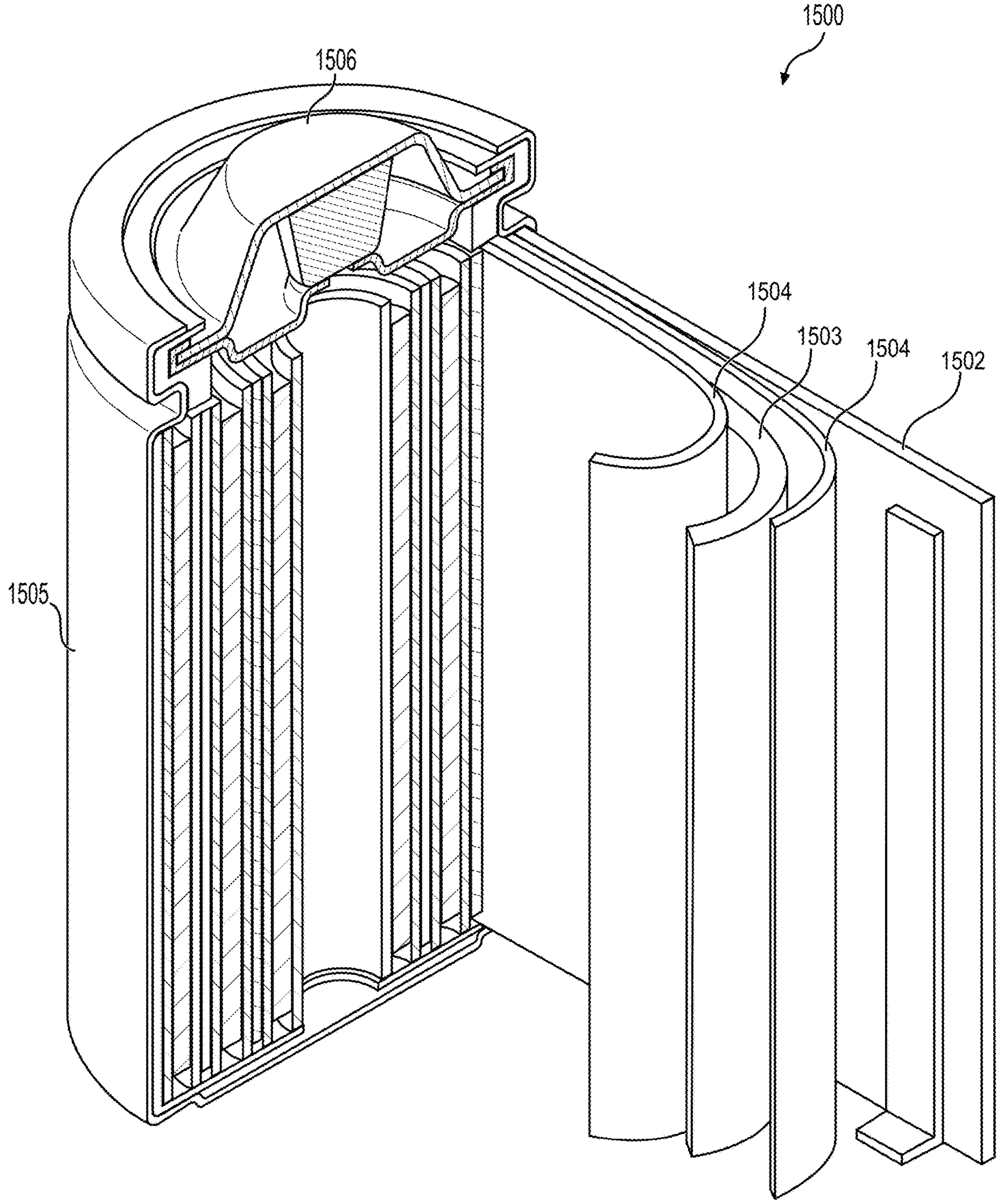
FIG. 15 illustrates an example metal-ion (e.g., Li-ion) battery in which the components, materials, methods, and other techniques described herein, or combinations thereof, may be applied according to various embodiments.

FIG. 15 illustrates an example metal-ion (e.g., Li-ion) battery 1500 in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 1500 includes a negative anode 1502, a positive cathode 1503, a separator 1504 interposed between the anode 1502 and the cathode 1503, an electrolyte (not labeled separately) impregnating the separator 1504, a battery case 1505, and a sealing member 1506 sealing the battery case 1505.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A solid-state Li-ion battery cell, comprising: an anode comprising anode active material; a cathode comprising cathode active material; and a solid electrolyte interposed between the anode and the cathode, the solid electrolyte comprising a melt-infiltration solid electrolyte composition infiltrated in at least a portion of the anode and at least a portion of the cathode; wherein the melt-infiltration solid electrolyte composition comprises a lithium halide compound selected from: $Li_{1+x}Mg_xAl_{1-x}Cl_4$, $Li_2MgCl_4$, LiCl, and $LiAlCl_4$, the x ranging between 0.00 and 1.00; and wherein the solid electrolyte is characterized by a melting temperature of approximately 200° C. or less.

Clause 2. The solid-state Li-ion battery cell of clause 1, wherein the x ranges between 0.00 and 0.33.

Clause 3. The solid-state Li-ion battery cell of any of clauses 1 to 2, wherein the solid electrolyte is characterized by an ionic conductivity of approximately $1\times10^{-6}$ S/cm or greater at approximately 25° C.

Clause 4. The solid-state Li-ion battery cell of any of clauses 1 to 3, wherein the anode active material is selected from: de-lithiated lithium iron phosphate, de-lithiated lithium nickel cobalt aluminum oxide, de-lithiated lithium nickel cobalt magnesium oxide, de-lithiated lithium manganese oxide, de-lithiated lithium manganese nickel oxide, lithium titanate, lithium niobate, lithium molybdate, lithium tungstate, a metal or semimetal, an alloy thereof, or a mixture thereof.

Clause 5. The solid-state Li-ion battery cell of any of clauses 1 to 4, wherein the cathode active material is selected from: lithium iron phosphate, lithium manganese phosphate, lithium iron manganese phosphate, lithium nickel oxide, lithium nickel cobalt manganese oxide, lithium nickel cobalt manganese aluminum oxide and lithium nickel cobalt aluminum oxide.

Clause 6. The solid-state Li-ion battery cell of any of clauses 1 to 5, additionally comprising a separator interposed between the anode and the cathode; wherein the melt-infiltration solid electrolyte composition is infiltrated in at least a portion of the separator.

Clause 7. The solid-state Li-ion battery cell of clause 6, wherein a thickness of the separator is approximately 30 μm or less.

Clause 8. The solid-state Li-ion battery cell of any of clauses 6 to 7, wherein an area specific resistance (ASR) of the solid-state Li-ion battery cell is approximately 100 $\Omega\cdot cm^2$ or less.

Clause 9. The solid-state Li-ion battery cell of any of clauses 6 to 8, wherein the separator comprises $Al_2O_3$ or AlO(OH) nanofibers or nanowires.

Clause 10. A method of making a solid-state Li-ion battery cell, comprising the steps of: (A1) providing a solid electrolyte composition comprising a lithium halide compound selected from: $Li_{1+x}Mg_xAl_{1-x}Cl_4$, $Li_2MgCl_4$, LiCl, and $LiAlCl_4$, the x ranging between 0.00 and 1.00; (A2) providing battery cell components including an anode comprising anode active material and a cathode comprising cathode active material; (A3) assembling the battery cell components and the solid electrolyte composition to form a battery cell assembly, the solid electrolyte composition being interposed between the anode and the cathode in the battery cell assembly; (A4) applying melt-infiltration treatment of the battery cell assembly comprising melting the solid electrolyte composition at a melt-treatment temperature such that a molten solid electrolyte composition infiltrates into at least a portion of the anode and at least a portion of the cathode; and (A5) cooling the battery cell assembly to form the solid-state Li-ion battery cell comprising a solid electrolyte comprising a melt-infiltration solid electrolyte composition that is formed from the molten solid electrolyte composition and is infiltrated in at least the portion of the anode and at least the portion of the cathode; wherein the solid electrolyte is characterized by a melting temperature of approximately 200° C. or less.

Clause 11. The method of clause 10, wherein the x ranges between 0.00 and 0.33.

Clause 12. The method of any of clauses 10 to 11, wherein the (A4) additionally comprises applying a pressure to the battery cell assembly during the melt-infiltration treatment.

Clause 13. The method of any of clauses 10 to 12, wherein the anode active material is selected from: de-lithiated lithium iron phosphate, de-lithiated lithium nickel cobalt aluminum oxide, lithium titanate, lithium niobate, lithium molybdate, lithium tungstate, a metal, semimetal, an alloy thereof, or a mixture thereof.

Clause 14. The method of any of clauses 10 to 13, wherein the cathode active material is selected from: lithium iron phosphate, lithium manganese phosphate, lithium iron manganese phosphate, lithium nickel oxide, lithium nickel manganese cobalt manganese oxide, lithium nickel cobalt manganese aluminum oxide and lithium nickel cobalt aluminum oxide.

Clause 15. The method of any of clauses 10 to 14, wherein: the battery cell components additionally include a separator; the battery cell assembly additionally comprises the separator interposed between the anode and the cathode in the battery cell assembly; the (A4) applying of the melt-infiltration treatment additionally comprises the molten solid electrolyte composition infiltrating into at least a portion of the separator; and the melt-infiltration solid electrolyte composition is infiltrated in at least the portion of the separator in the solid-state Li-ion battery cell upon the (A5) cooling of the battery cell assembly.

Clause 16. The method of clause 15, wherein a thickness of the separator is approximately 30 μm or less.

Clause 17. The method of any of clauses 15 to 16, wherein the separator comprises $Al_2O_3$ or AlO(OH) nanofibers or nanowires.

Clause 18. A method of making an electrode for a solid-state Li-ion battery cell, comprising the steps of: (B1) providing an electrode coating comprising electrode active material; (B2) providing a solid electrolyte composition comprising a lithium halide compound selected from: $Li_{1+x}Mg_xAl_{1-x}Cl_4$, $Li_2MgCl_4$, LiCl, and $LiAlCl_4$, the x ranging between 0.00 and 1.00; (B3) contacting the solid electrolyte composition to the electrode coating; (B4) applying melt-infiltration treatment of the solid electrolyte composition and the electrode coating comprising melting the solid electrolyte composition at a melt-treatment temperature such that a molten solid electrolyte composition infiltrates into at least a portion of the electrode coating; and (B5) cooling the infiltrated molten solid electrolyte composition and the electrode coating to form the electrode comprising a solid electrolyte comprising a melt-infiltration solid electrolyte composition that is formed from the molten solid electrolyte composition and is infiltrated in at least the portion of the electrode; wherein the solid electrolyte is characterized by a melting temperature of approximately 200° C. or less.

Clause 19. The method of clause 18, wherein the x ranges between 0.00 and 0.33.

Clause 20. The method of any of clauses 18 to 19, wherein a concentration of In and/or Br in the solid electrolyte composition is about 1 wt. % or less.

Clause 21. The method of any of clauses 18 to 20, wherein: the electrode is an anode, the electrode coating is an anode coating, and the electrode active material is an anode active material.

Clause 22. The method of clause 21, wherein the anode active material is selected from: de-lithiated lithium iron phosphate, de-lithiated lithium nickel cobalt aluminum oxide, de-lithiated lithium nickel cobalt magnesium oxide, de-lithiated lithium manganese oxide, de-lithiated lithium manganese nickel oxide, lithium titanate, lithium niobate, lithium molybdate, lithium tungstate, a metal or semimetal, an alloy thereof, or a mixture thereof.

Clause 23. The method of any of clauses 18 to 22, wherein: the electrode is a cathode, the electrode coating is a cathode coating, and the electrode active material is a cathode active material.

Clause 24. The method of clause 23, wherein the cathode active material is selected from: lithium iron phosphate, lithium manganese phosphate, lithium iron manganese phosphate, lithium nickel oxide, lithium nickel manganese cobalt manganese oxide, lithium nickel cobalt manganese aluminum oxide and lithium nickel cobalt aluminum oxide.

The description is provided to enable any person skilled in the art to make or use embodiments of the present disclosure. It will be appreciated, however, that the present disclosure is not limited to the particular formulations, process steps, and materials disclosed herein, as various modifications to these embodiments will be readily apparent to those skilled in the art. That is, the generic principles defined herein may be applied to other embodiments without departing from the spirit or scope of the disclosure.

The invention claimed is:

1. A separator, comprising:

nanowires or nanofibers comprising one or more of $Al_2O_3$, $AlO(OH)$, $Al(OH)_3$, $MgO$, $AlF_xO_y$ (where $2\cdot y+1\cdot x=3$), and/or $MgF_{x1}O_{y1}$ (where $2\cdot y1+1\cdot x1=2$), wherein:

a thickness of the separator is about 30 μm or less; and the separator is mechanically stable up to a temperature of greater than 500° C.

2. The separator of claim 1, wherein:

the thickness of the separator is about 25 μm or less.

3. The separator of claim 2, wherein:

the thickness of the separator is in a range of about 2 to about 5 μm.

4. The separator of claim 1, wherein:

a porosity of the separator is about 70 vol. % or greater.

5. A Li-ion battery, comprising:

an anode;

a cathode;

the separator according to claim 1 positioned between the anode and the cathode; and an electrolyte ionically coupling the anode and the cathode and infiltrated into the separator.

6. The Li-ion battery of claim 5, wherein:

the electrolyte comprises chlorine (Cl) in its composition.

7. The Li-ion battery of claim 6, wherein:

the electrolyte comprises lithium metal chloride in its composition.

8. The Li-ion battery of claim 5, wherein:

the electrolyte comprises fluorine (F) in its composition.

9. The Li-ion battery of claim 5, wherein:

the electrolyte comprises sulfur(S) in its composition.

10. The Li-ion battery of claim 5, wherein:

the electrolyte comprises nitrogen (N) in its composition.

11. The Li-ion battery of claim 5, wherein:

the electrolyte comprises one or more ionic liquids in its composition.

12. The Li-ion battery of claim 11, wherein one or more ionic liquids comprise an imidazolium cation.

13. The Li-ion battery of claim 5, wherein:

the electrolyte comprises a solid electrolyte.

14. The Li-ion battery of claim 13, wherein:

the solid electrolyte is melt-infiltrated into the separator.

15. The Li-ion battery of claim 5, wherein:

the cathode comprises a cathode active material; and the cathode active material comprises nickel (Ni) in its composition.

16. The Li-ion battery of claim 15, wherein:

an atomic fraction of the Ni in the cathode active material is more than about 80 at. % relative to all transition metals in the cathode active material.

17. The Li-ion battery of claim 5, wherein:

the cathode comprises a cathode active material; and the cathode active material comprises cobalt (Co) in its composition.

18. The Li-ion battery of claim 5, wherein:

the cathode comprises a cathode active material; and the cathode active material is selected from: lithium iron phosphate, lithium manganese phosphate, lithium iron manganese phosphate, lithium nickel oxide, lithium nickel cobalt manganese oxide, lithium nickel cobalt manganese aluminum oxide and lithium nickel cobalt aluminum oxide.

19. The Li-ion battery of claim 5, wherein:

a cathode areal capacity loading exceeds about 2 $mAh/cm^2$.

20. The Li-ion battery of claim 19, wherein:

the cathode areal capacity loading exceeds about 4 $mAh/cm^2$.

* * * * *